US012529785B2

(12) United States Patent
Corner et al.

(10) Patent No.: US 12,529,785 B2
(45) Date of Patent: Jan. 20, 2026

(54) RADAR SYSTEM AND ASSEMBLY

(71) Applicant: Magna Electronics Inc., Auburn Hills, MI (US)

(72) Inventors: Allan Corner, Newmarket (CA); Earnest Lock, Newmarket (CA); Cuong Tran, Newmarket (CA); Kurt Schatz, Newmarket (CA)

(73) Assignee: Magna Electronics Inc., Auburn Hills, MI (US)

( * ) Notice: Subject to any disclaimer, the term of this patent is extended or adjusted under 35 U.S.C. 154(b) by 764 days.

(21) Appl. No.: 17/623,282

(22) PCT Filed: Jul. 2, 2020

(86) PCT No.: PCT/CA2020/050917
§ 371 (c)(1),
(2) Date: Dec. 28, 2021

(87) PCT Pub. No.: WO2021/000045
PCT Pub. Date: Jan. 7, 2021

(65) Prior Publication Data
US 2022/0365207 A1 Nov. 17, 2022

Related U.S. Application Data

(60) Provisional application No. 62/985,584, filed on Mar. 5, 2020, provisional application No. 62/869,775, filed on Jul. 2, 2019.

(51) Int. Cl.
*G01S 13/931* (2020.01)
*G01S 7/02* (2006.01)
(Continued)

(52) U.S. Cl.
CPC .......... *G01S 13/931* (2013.01); *G01S 7/027* (2021.05); *G01S 13/56* (2013.01); *H01Q 1/3233* (2013.01);
(Continued)

(58) Field of Classification Search
CPC ........ G01S 13/931; G01S 13/56; G01S 7/027; G01S 2013/93275; G01S 2013/93272; H01Q 1/3233
See application file for complete search history.

(56) References Cited

U.S. PATENT DOCUMENTS 5,125,110 A * 6/1992 Nusair ................ H03D 9/0633
455/330
2004/0056822 A1* 3/2004 McCarthy ............. H01Q 21/26
343/895

(Continued)

FOREIGN PATENT DOCUMENTS

CN 1790942 A * 6/2006
CN 204021110 U * 12/2014
(Continued)

*Primary Examiner* — Jack W Keith
(74) *Attorney, Agent, or Firm* — HONIGMAN LLP

(57) ABSTRACT

A non-contact object and/or gesture detection system includes at least one sensor configured to sense an object or motion within a field of view (FOV) using radio frequency radiation. Various sensor and brackets are provided which may allow a position and/or tilt of the sensor to be adjusted for controlling the FOV. A sensor housing includes a vent filter that breathable but impermeable to liquids. Various antenna designs are provided to provide desired FOV sizes and shapes, particularly for optimizing a radiation pattern that is relatively wide and shallow. A steerable antenna layout is also provided for controlling the location of the FOV without an adjustable bracket. A sensor housing includ-
(Continued)

ing a projector mount for an icon projector is provided. A seal prevents debris from entering between the antenna and the bumper.

16 Claims, 47 Drawing Sheets

(51) Int. Cl.
*G01S 13/56* (2006.01)
*H01Q 1/32* (2006.01)

(52) U.S. Cl.
CPC . *E05Y 2400/44* (2013.01); *G01S 2013/93272* (2020.01); *G01S 2013/93275* (2020.01)

(56) References Cited

U.S. PATENT DOCUMENTS

| | | |
|---|---|---|
| 2009/0284405 A1 | 11/2009 | Salmon et al. |
| 2010/0253543 A1 | 10/2010 | Szczerba et al. |
| 2013/0033404 A1* | 2/2013 | Abe ..................... H01Q 21/005 343/776 |
| 2015/0355313 A1* | 12/2015 | Li ........................... G01S 13/66 342/195 |
| 2016/0059777 A1* | 3/2016 | Malone ................... B60Q 9/00 340/426.1 |
| 2017/0195106 A1* | 7/2017 | Pehlke ..................... H04B 1/38 |
| 2017/0324162 A1 | 11/2017 | Khachaturian et al. |
| 2017/0328997 A1* | 11/2017 | Silverstein ................ G01S 7/41 |
| 2018/0062727 A1* | 3/2018 | Savage ................ H01Q 19/062 |
| 2018/0252808 A1* | 9/2018 | Helvajian ............. G01S 13/931 |
| 2019/0122056 A1 | 4/2019 | Tran et al. |
| 2019/0154439 A1 | 5/2019 | Binder |

FOREIGN PATENT DOCUMENTS

| | | |
|---|---|---|
| DE | 102016001121 A1 * | 8/2017 |
| WO | WO-2018138725 A1 * | 8/2018 .......... G01S 13/345 |

* cited by examiner

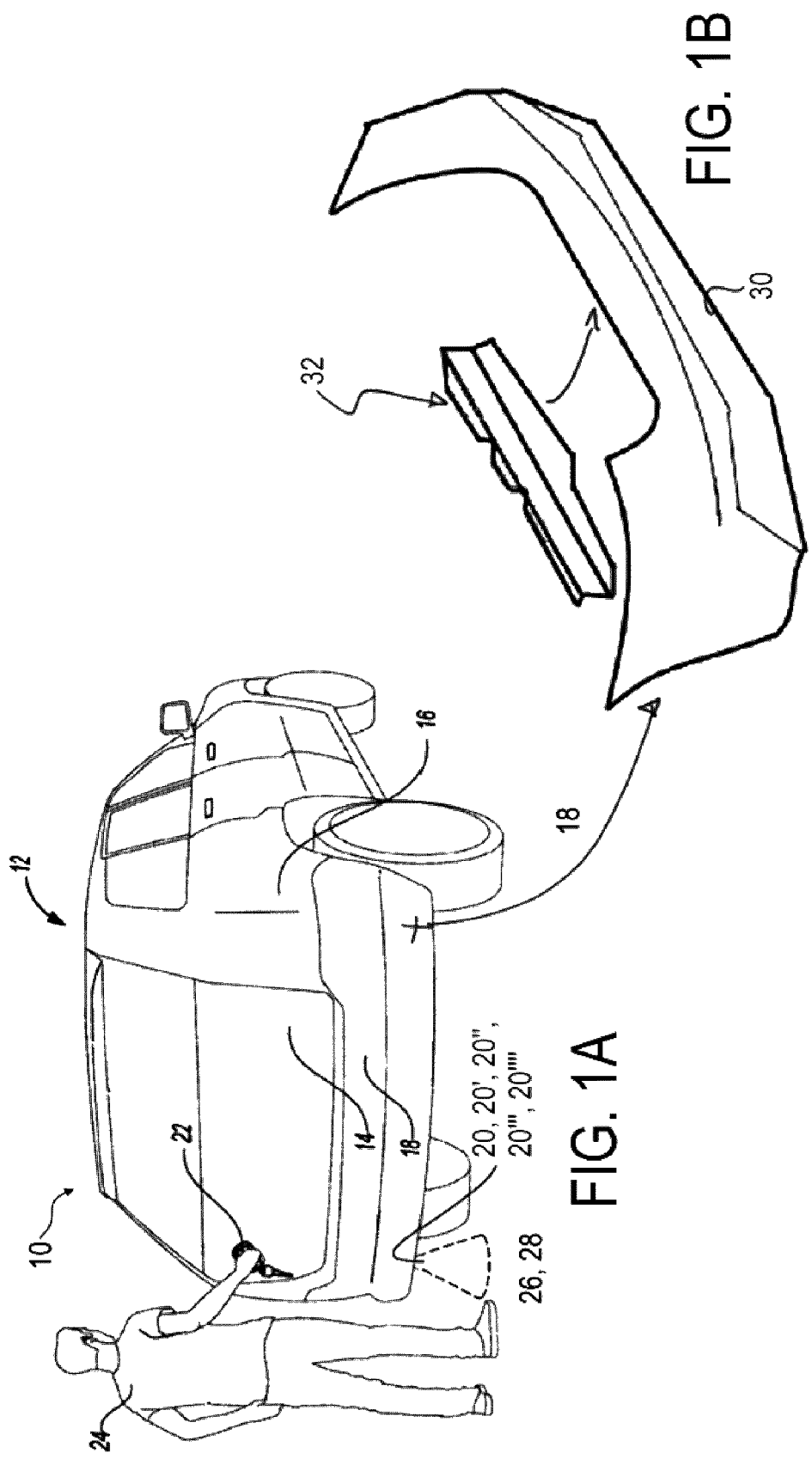

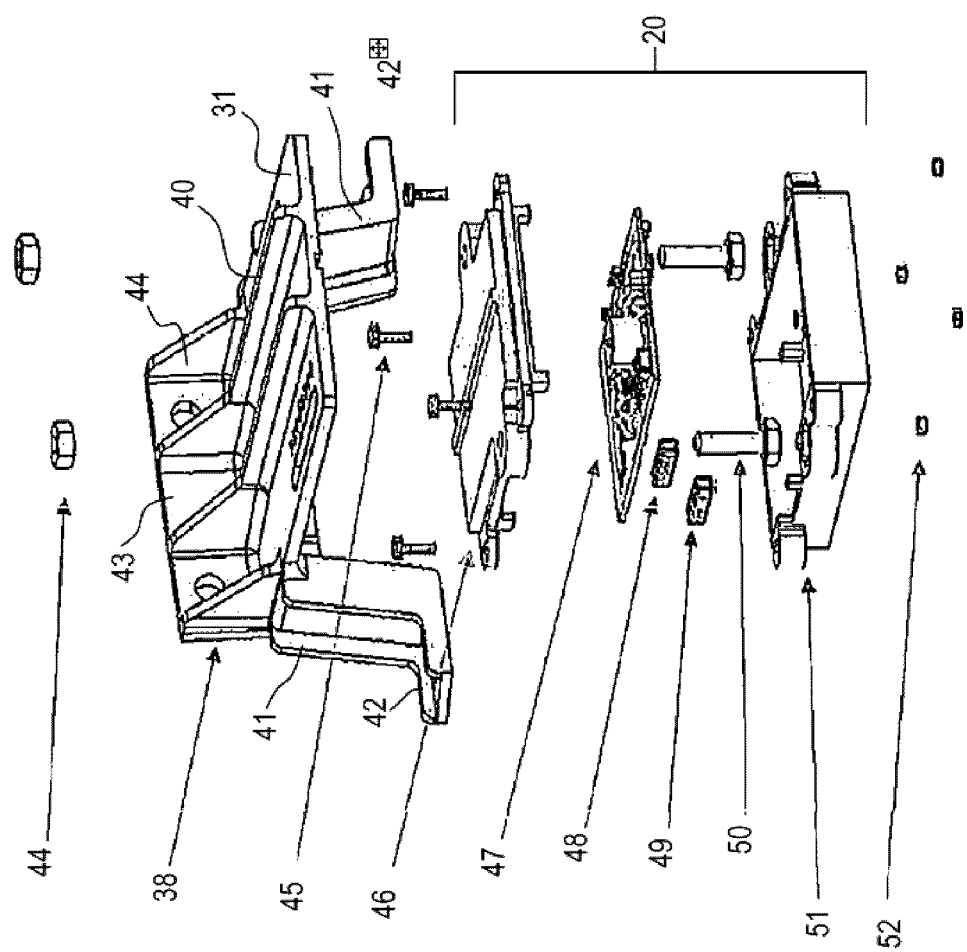

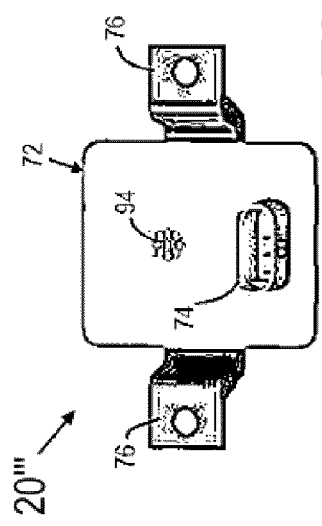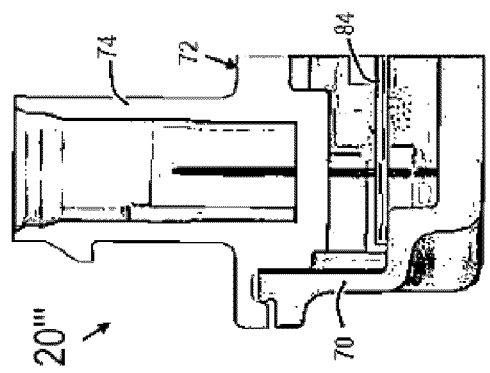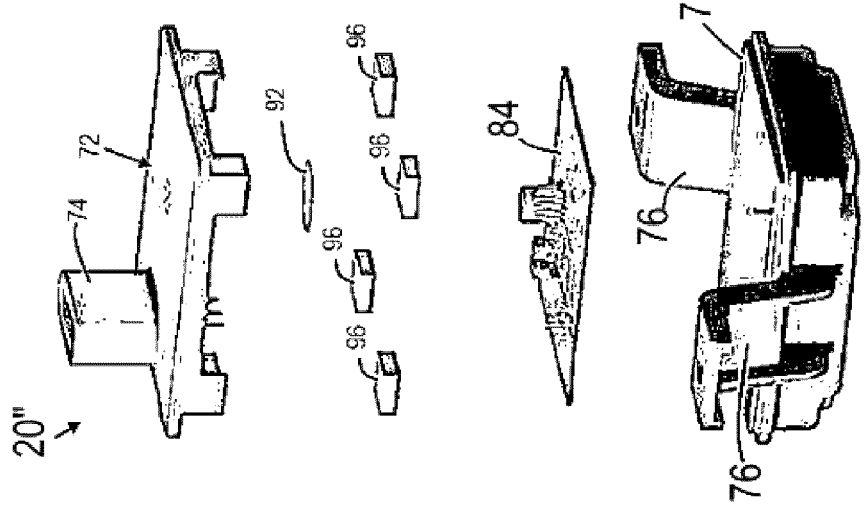

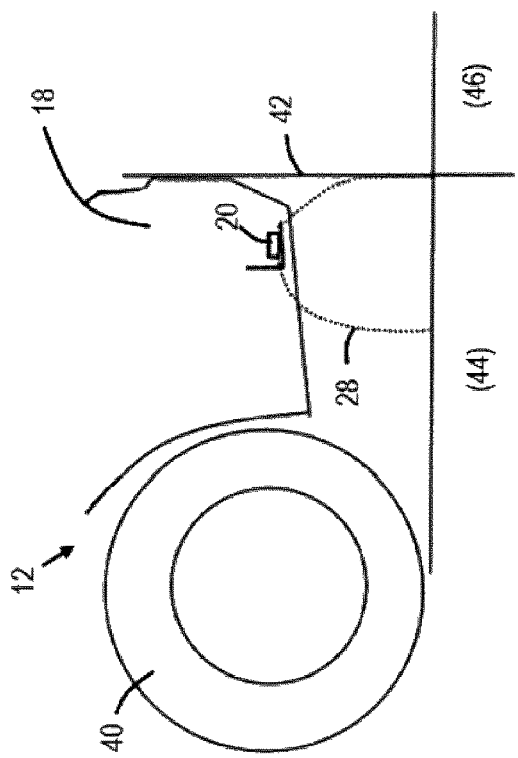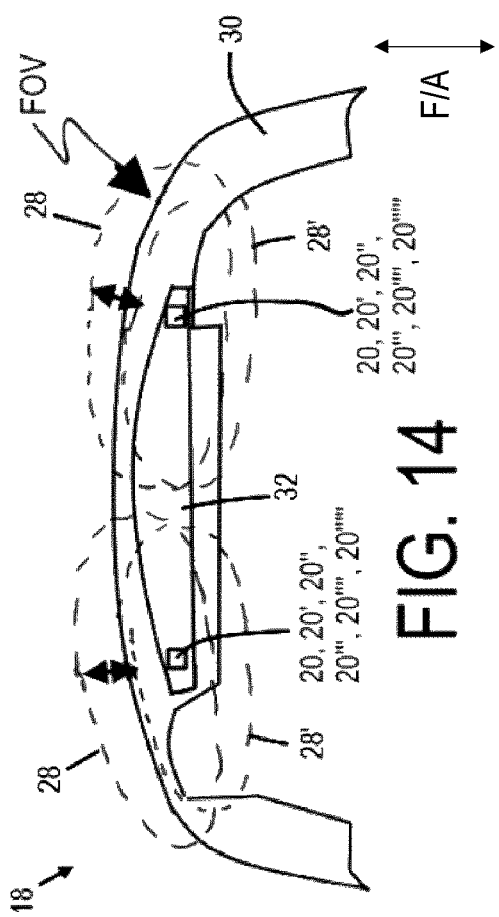

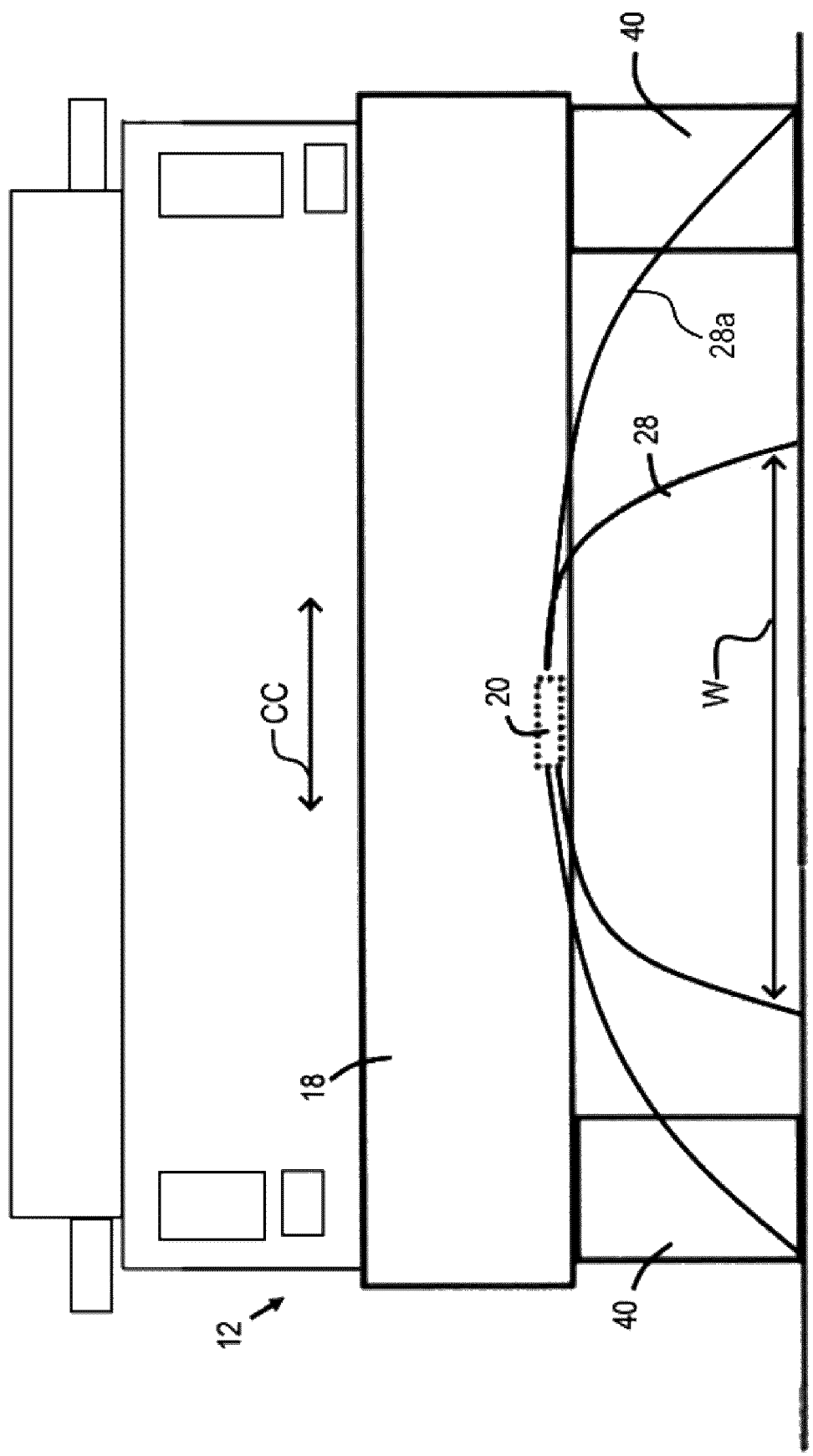

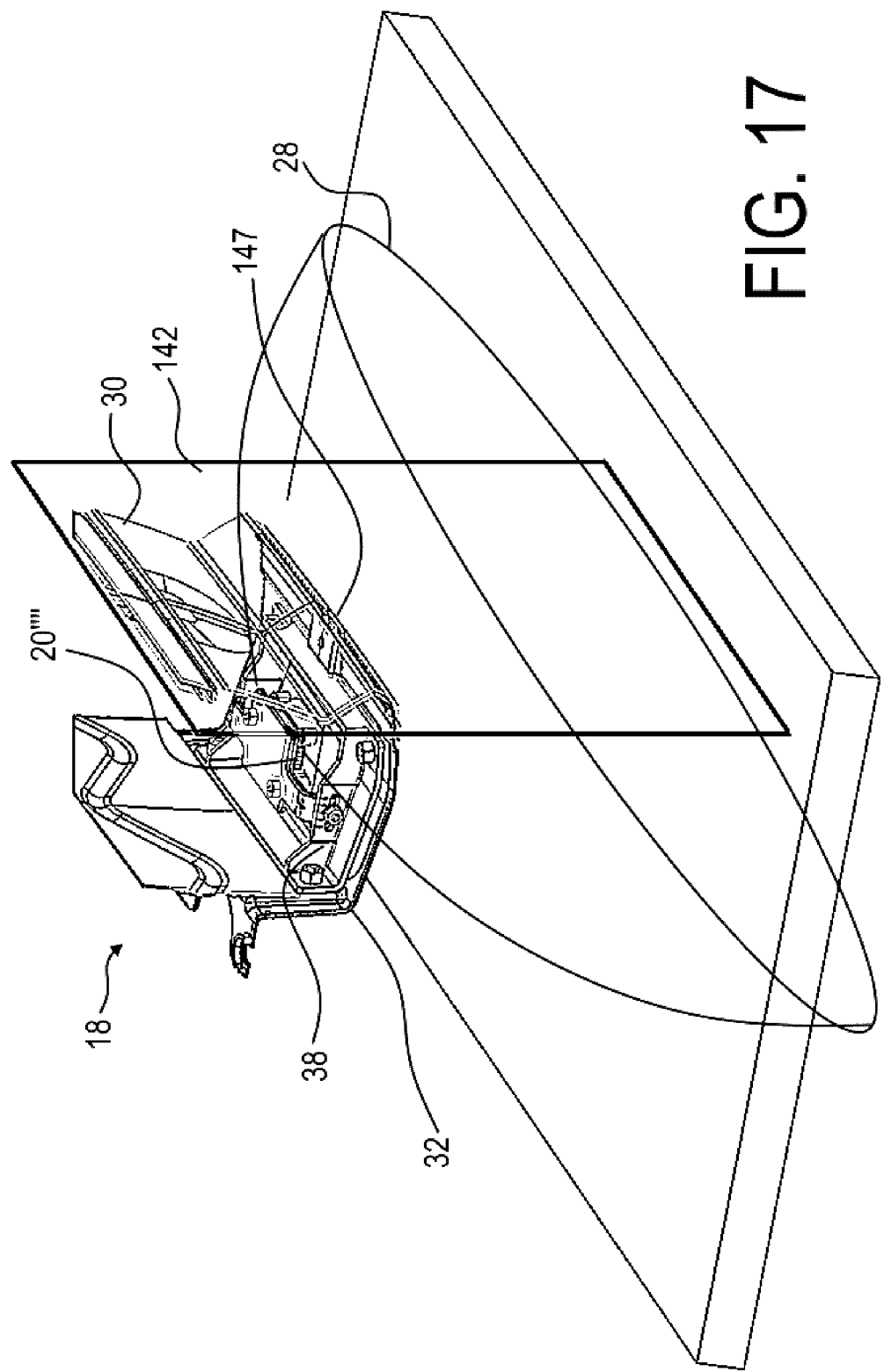

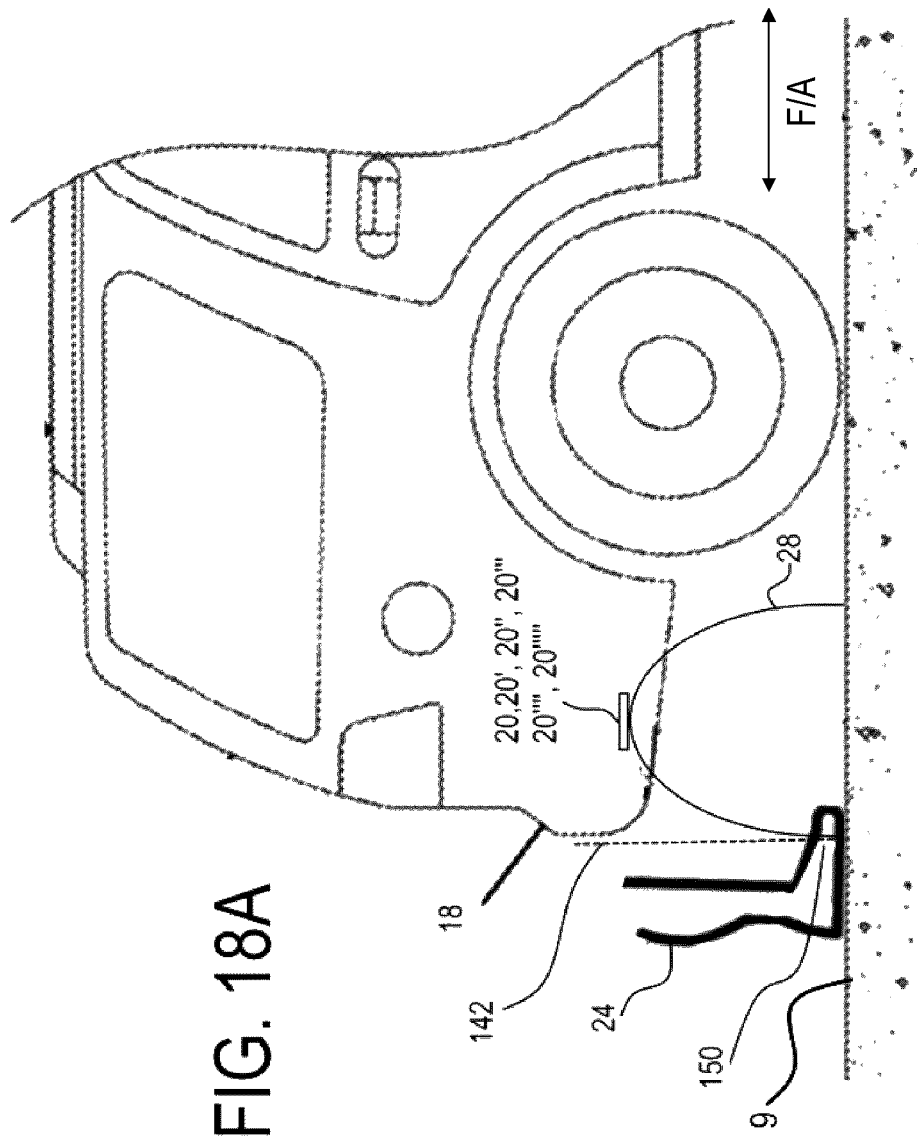

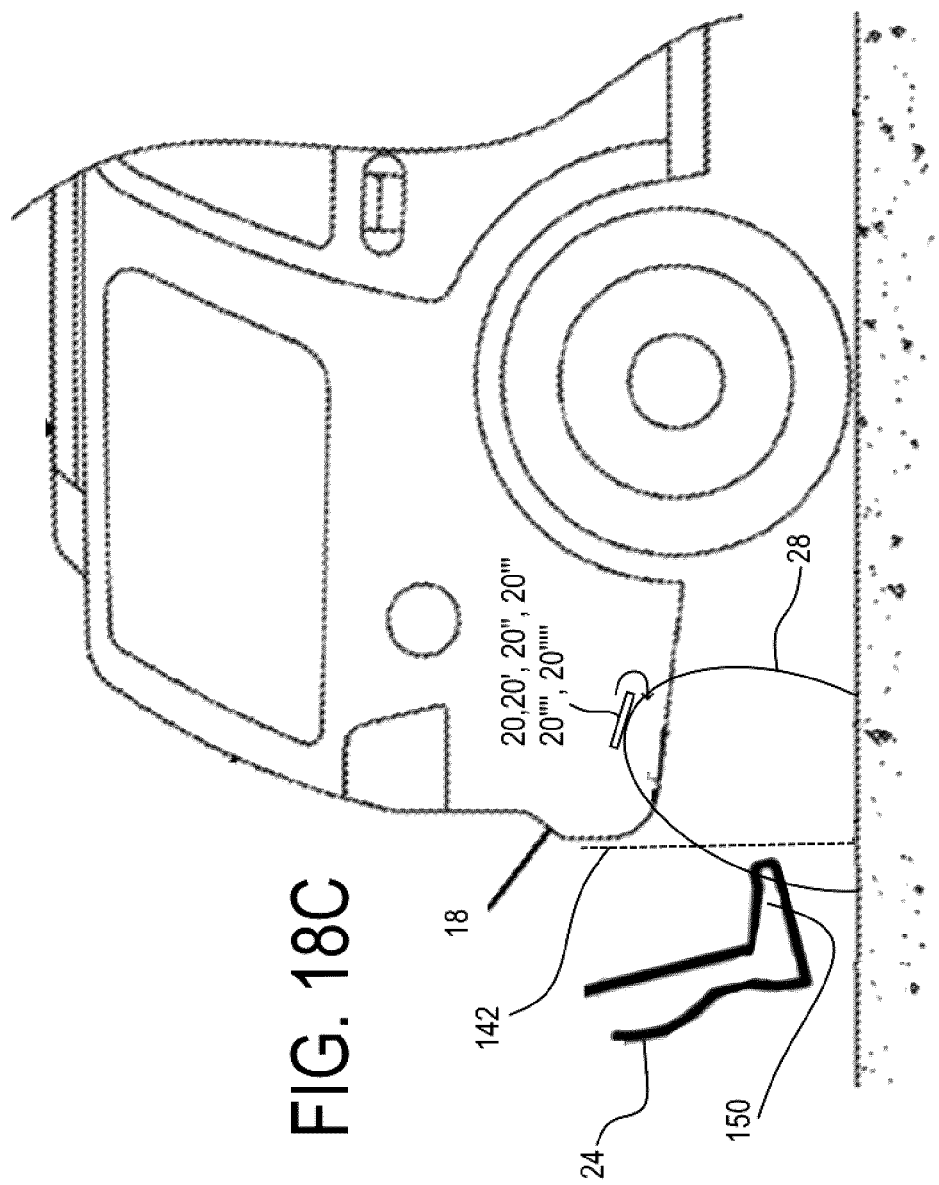

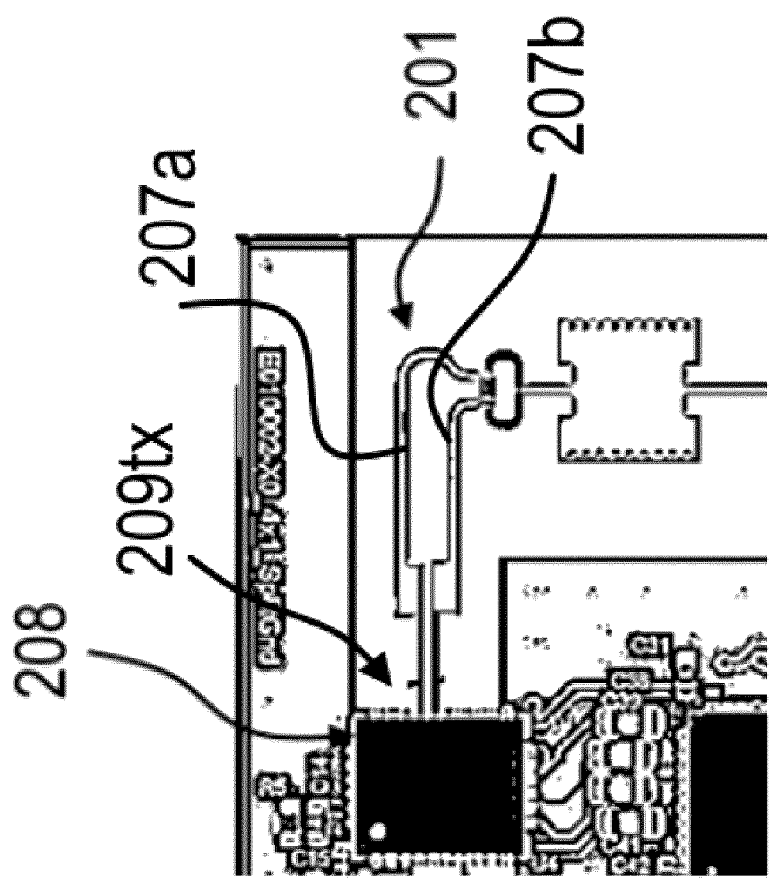

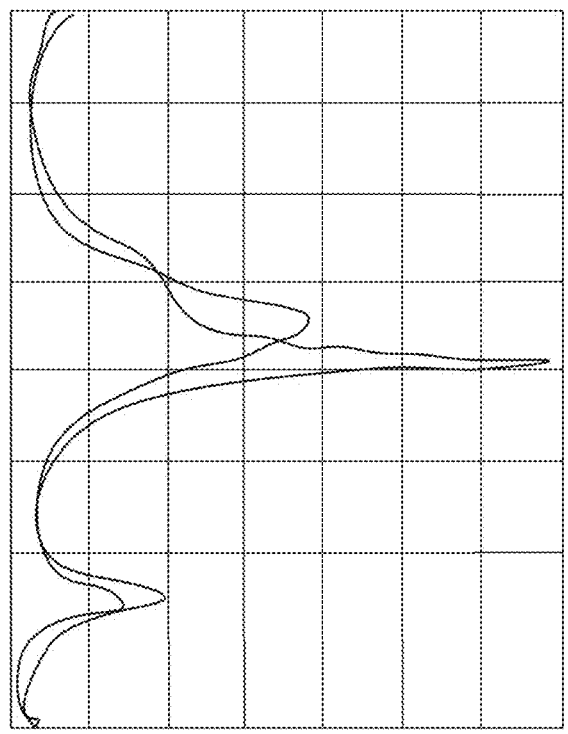
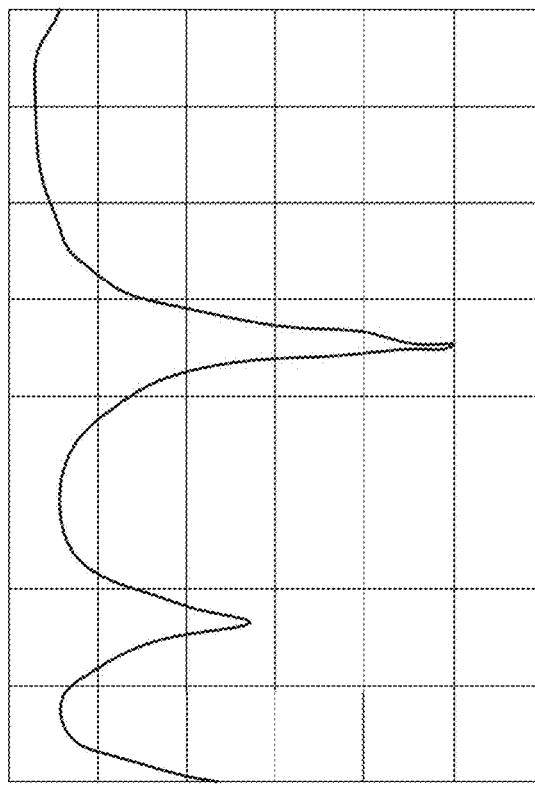
FIG. 21B

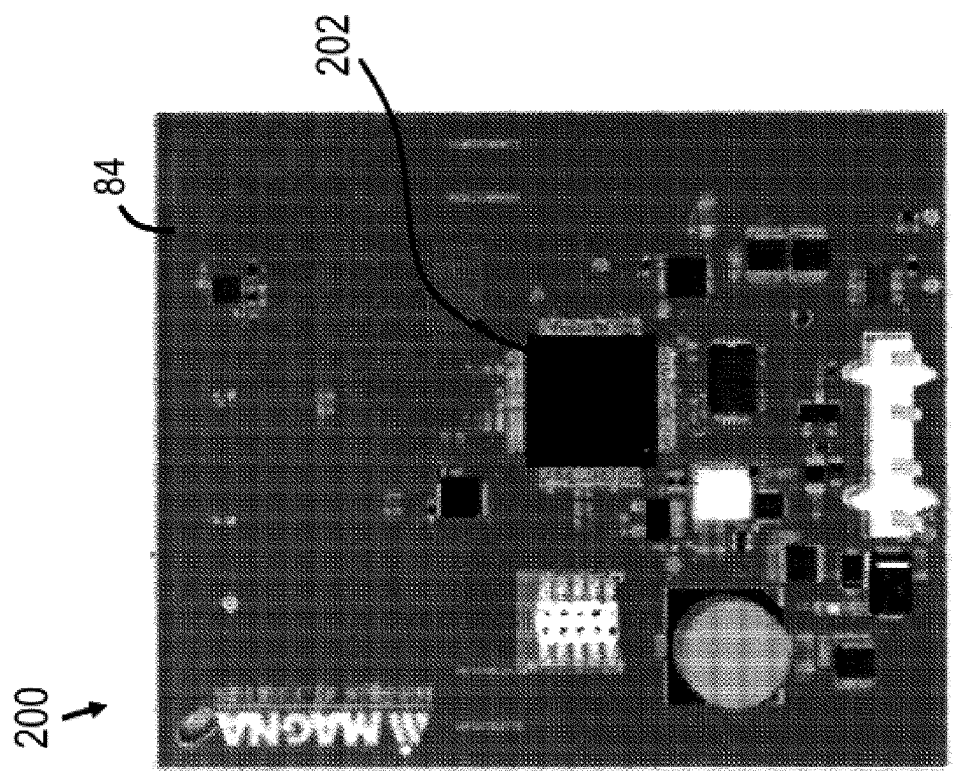
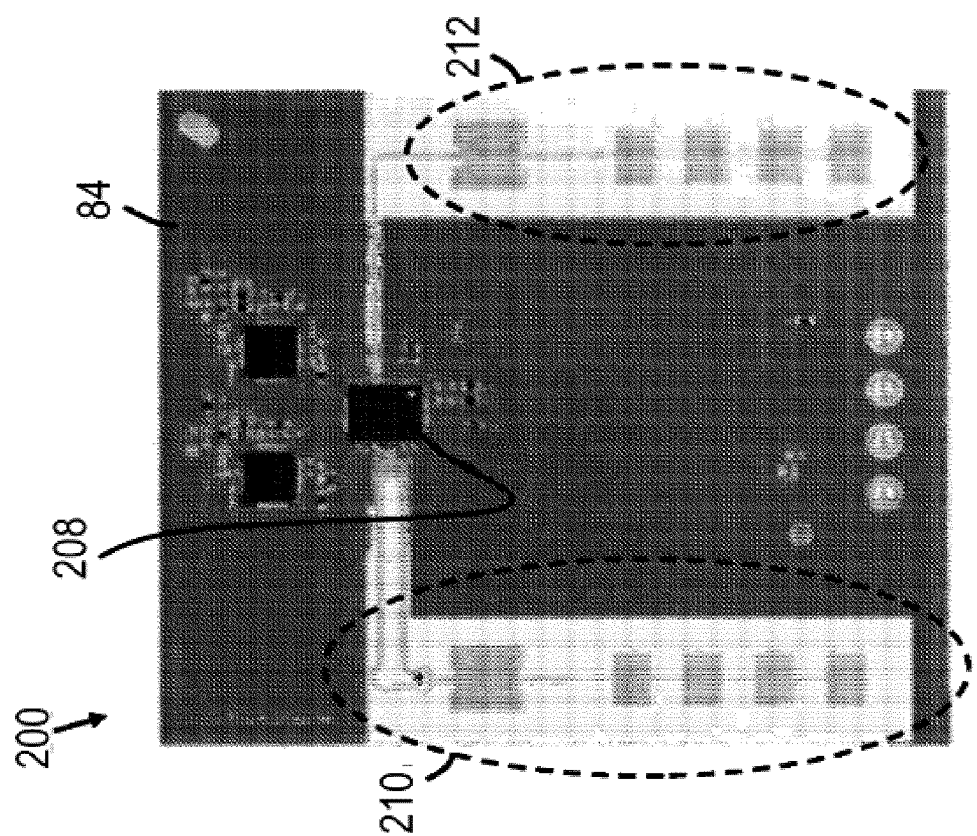
FIG. 24B
FIG. 24A

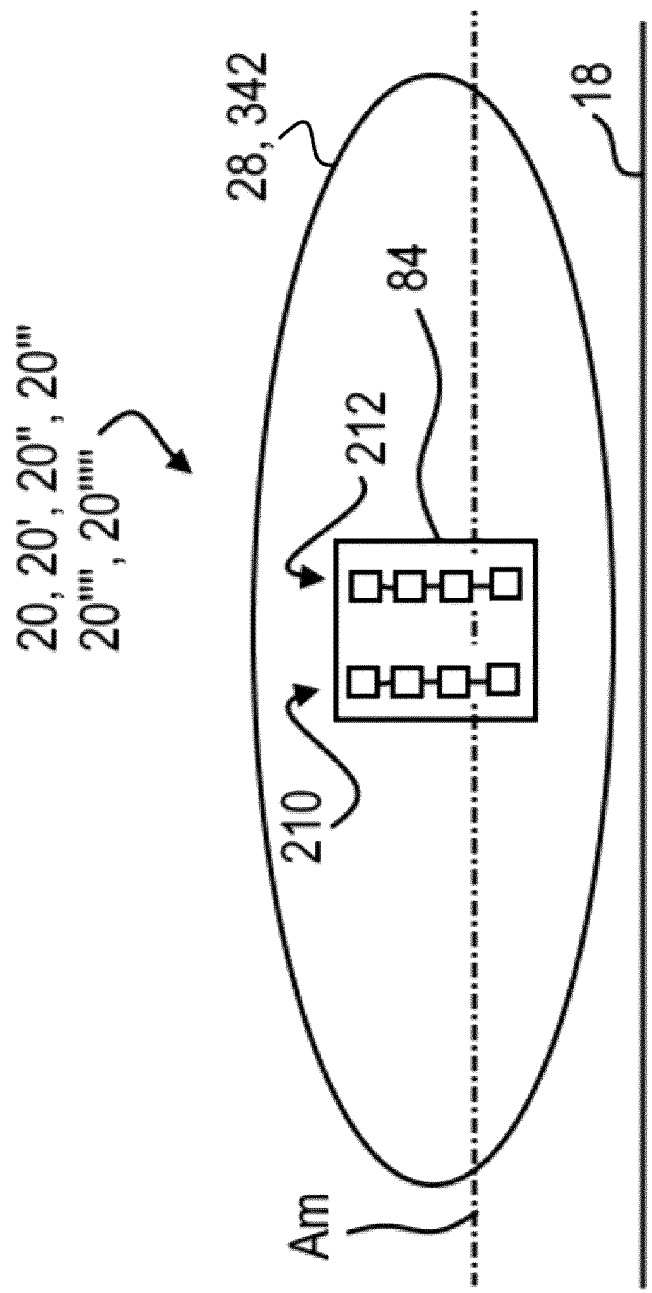

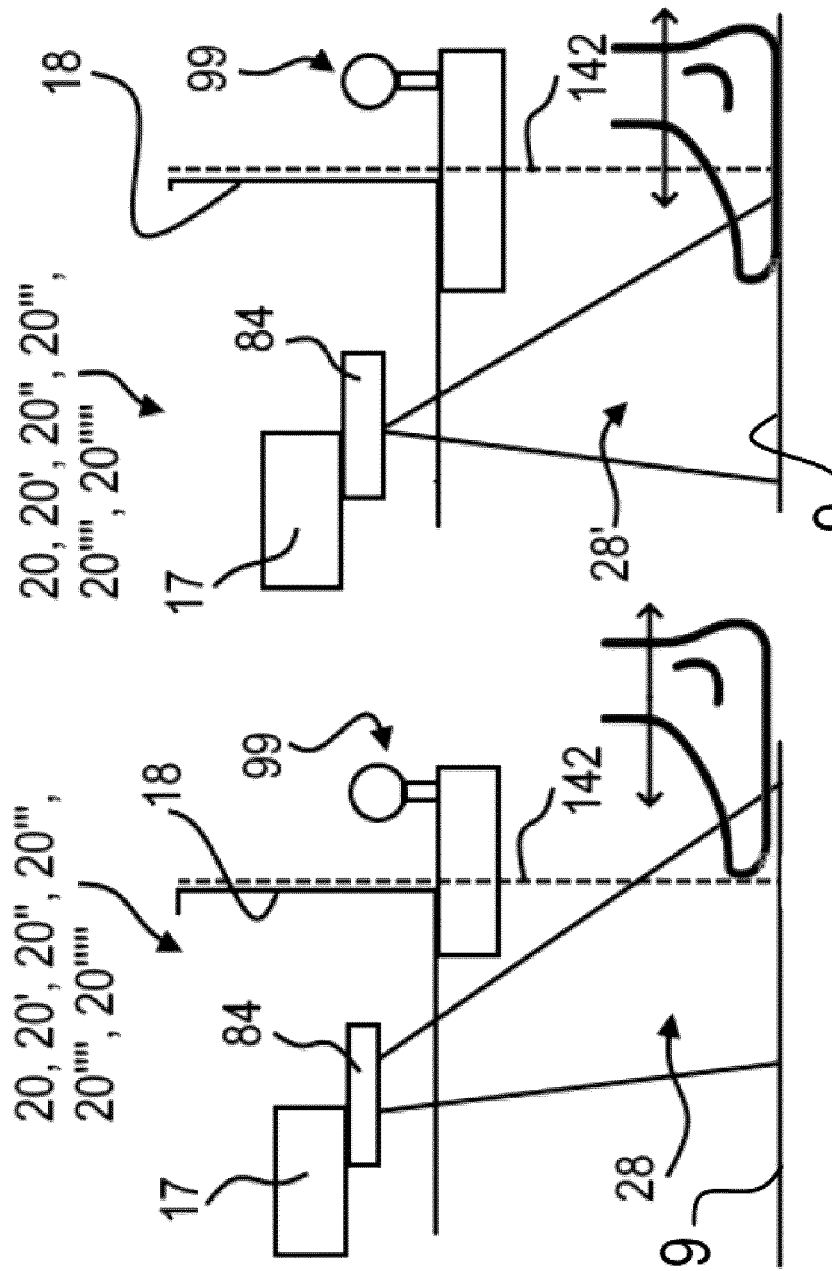

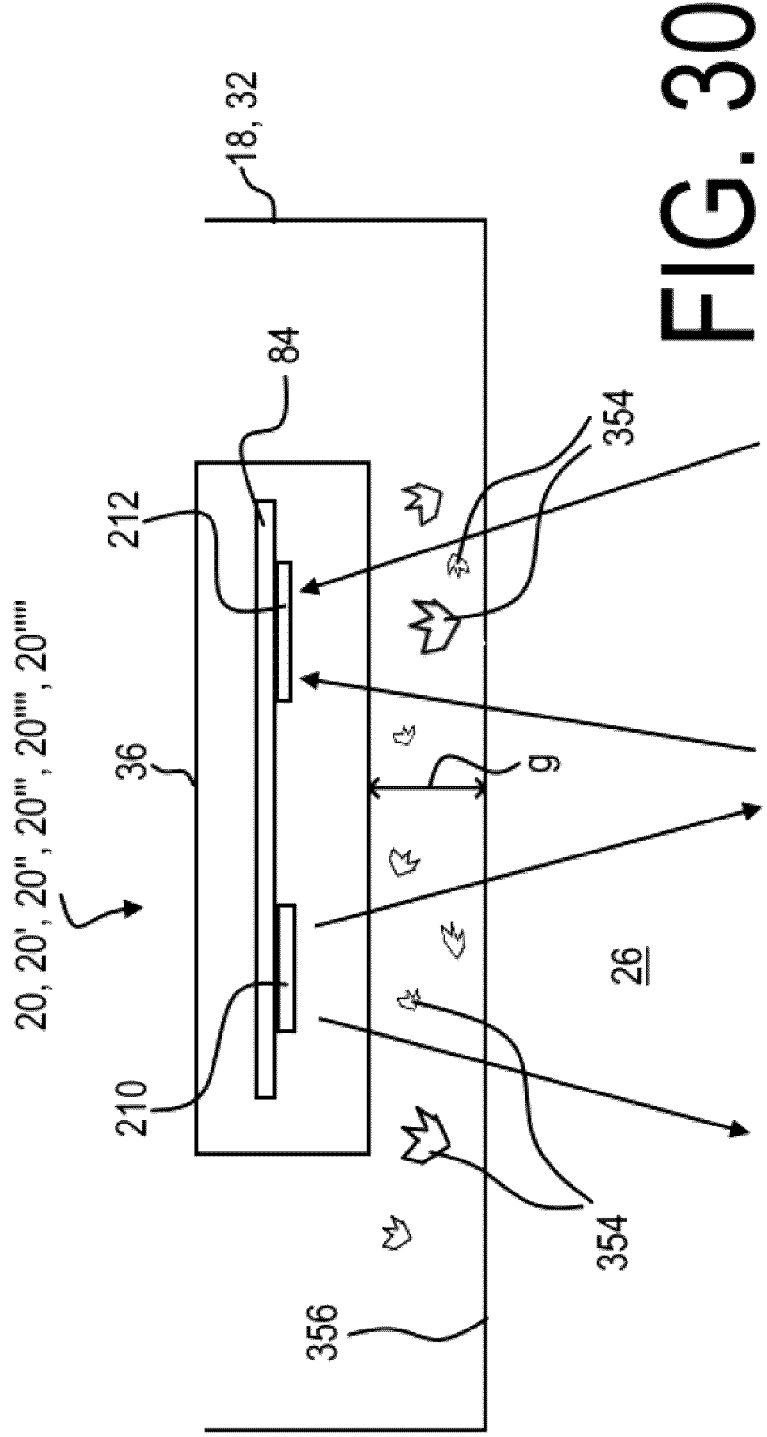

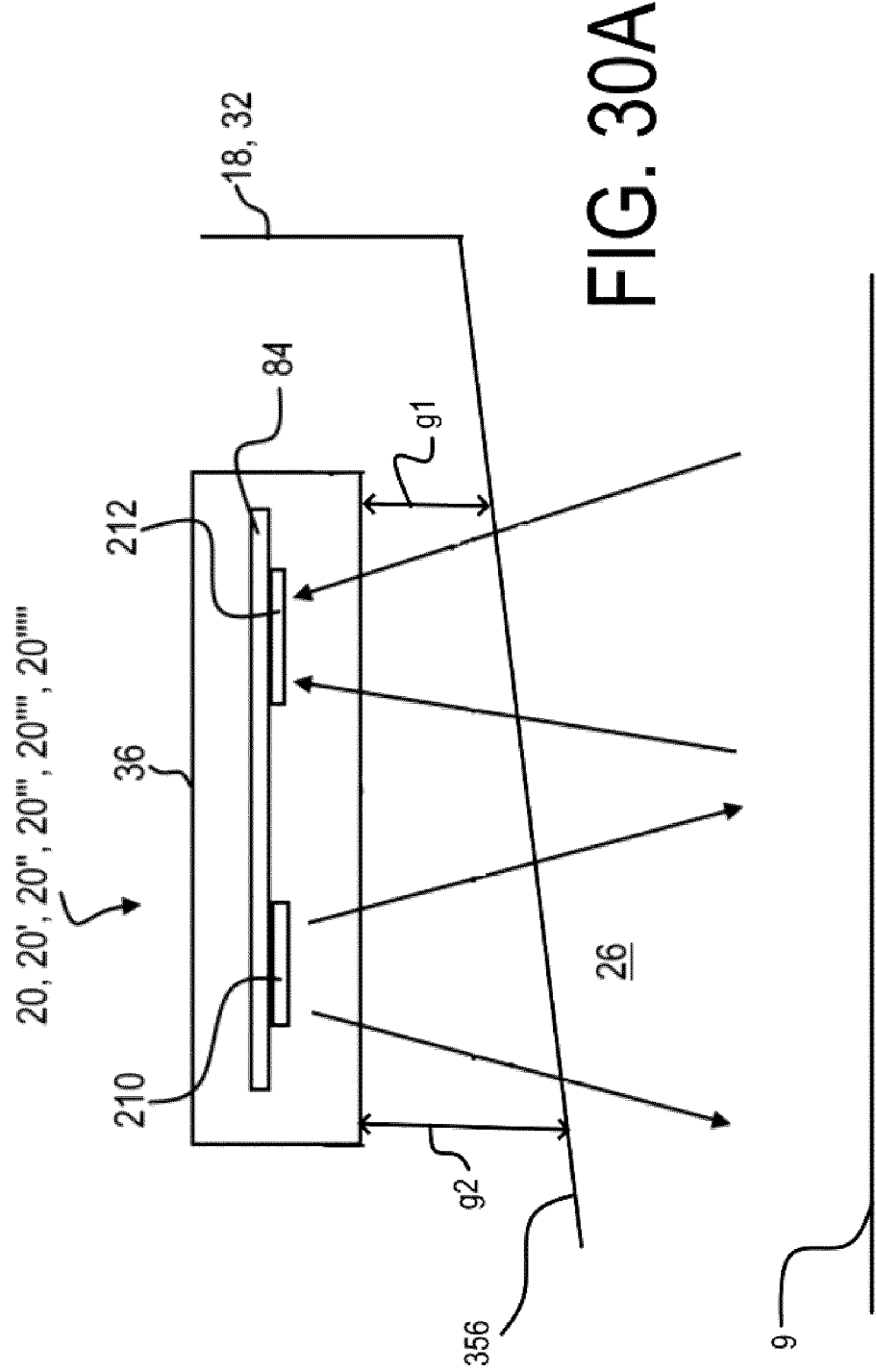

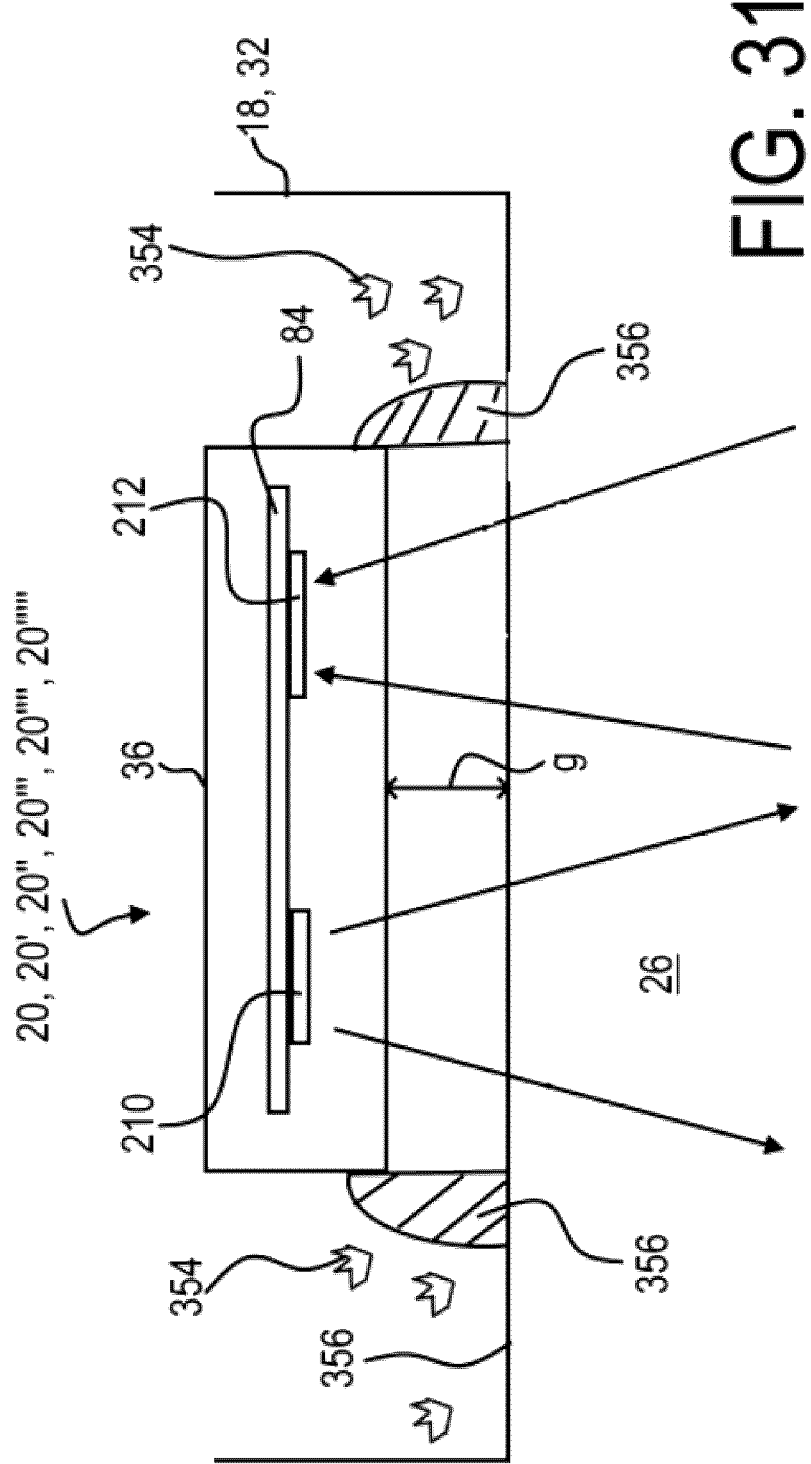

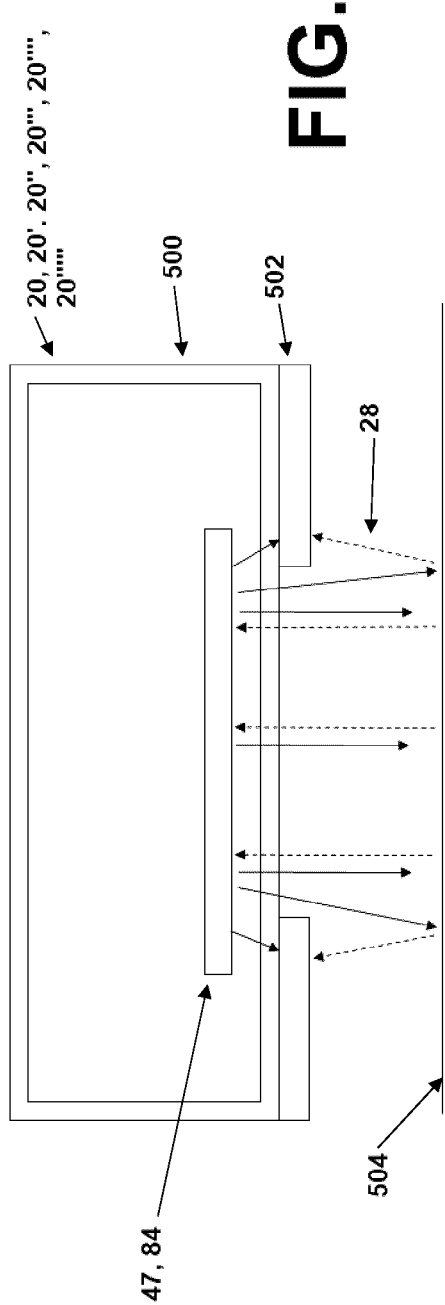

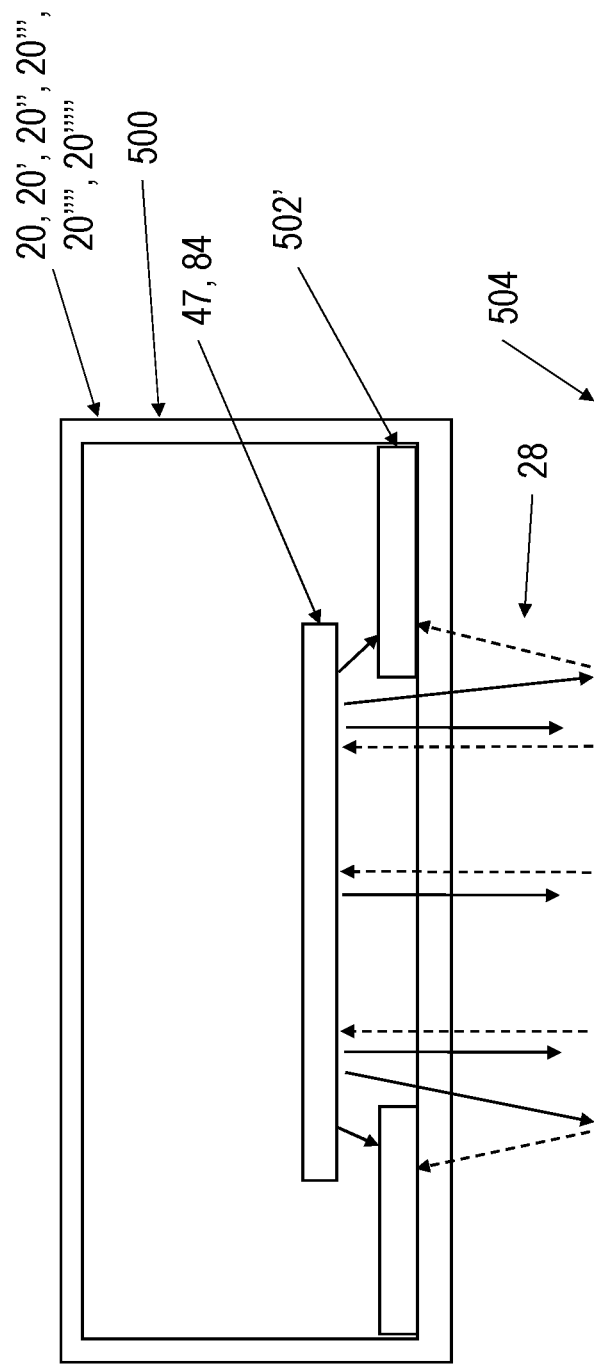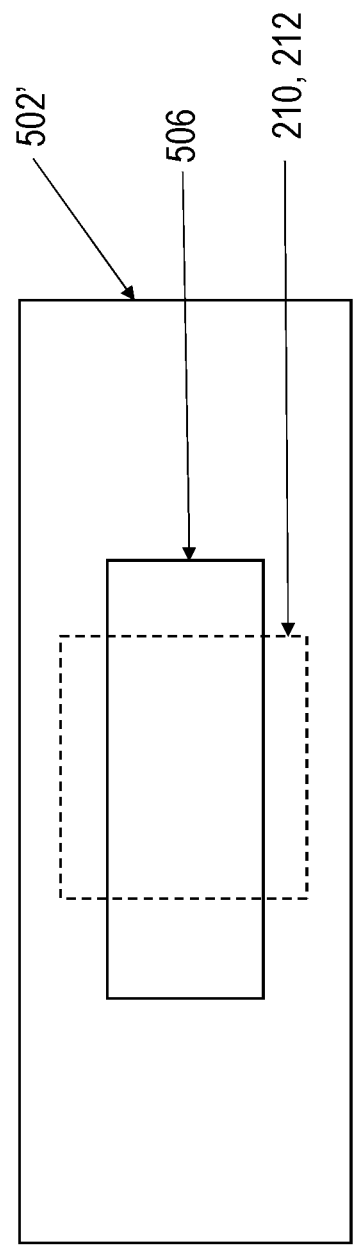
FIG. 34A
FIG. 34B

| Frequency (GHz) | SiC particle size (microns) | SiC Radar Absorption Test Plan Concentration (%) | Layer Thickness (mm) | Test # |
|---|---|---|---|---|
| 24 | 8 | 26 | 3.85 | 1 |
| | | | 3.5 | 2 |
| | | | 3.35 | 3 |
| | | 28 | 3.85 | 4 |
| | | | 3.5 | 5 |
| | | | 3.35 | 6 |
| | | 30 | 3.85 | 7 |
| | | | 3.5 | 8 |
| | | | 3.35 | 9 |
| | 18 | 26 | 3.85 | 10 |
| | | | 3.5 | 11 |
| | | | 3.35 | 12 |
| | | 28 | 3.85 | 13 |
| | | | 3.5 | 14 |
| | | | 3.35 | 15 |
| | | 30 | 3.85 | 16 |
| | | | 3.5 | 17 |
| | | | 3.35 | 18 |
| | 35 | 26 | 3.85 | 19 |
| | | | 3.5 | 20 |
| | | | 3.35 | 21 |
| | | 28 | 3.85 | 22 |
| | | | 3.5 | 23 |
| | | | 3.35 | 24 |
| | | 30 | 3.85 | 25 |
| | | | 3.5 | 26 |
| | | | 3.35 | 27 |
| | 70 | 26 | 3.85 | 28 |
| | | | 3.5 | 29 |
| | | | 3.35 | 30 |
| | | 28 | 3.85 | 31 |
| | | | 3.5 | 32 |
| | | | 3.35 | 33 |
| | | 30 | 3.85 | 34 |
| | | | 3.5 | 35 |
| | | | 3.35 | 36 |

FIG. 35

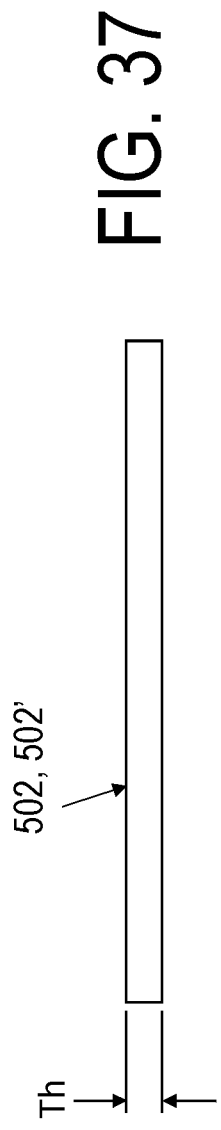
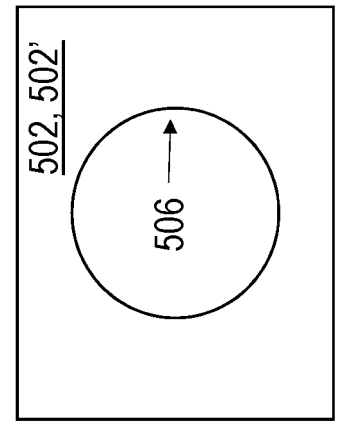
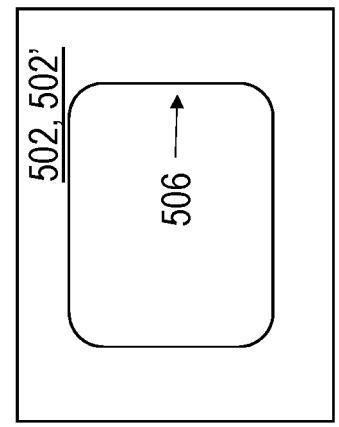
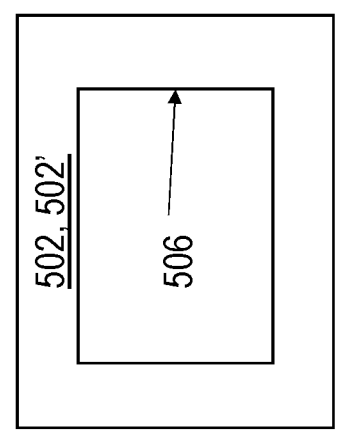

| SiC Radar Absorption Test Plan | | | |
|---|---|---|---|
| SiC particle size (microns) | Concentration (%) | Layer Thickness (mm) | Test # |
| 8 | 26 | 1 | 1 |
| | | 2 | 2 |
| | | 3 | 3 |
| | 28 | 1 | 4 |
| | | 2 | 5 |
| | | 3 | 6 |
| | 30 | 1 | 7 |
| | | 2 | 8 |
| | | 3 | 9 |
| 18 | 26 | 1 | 10 |
| | | 2 | 11 |
| | | 3 | 12 |
| | 28 | 1 | 13 |
| | | 2 | 14 |
| | | 3 | 15 |
| | 30 | 1 | 16 |
| | | 2 | 17 |
| | | 3 | 18 |
| 35 | 26 | 1 | 19 |
| | | 2 | 20 |
| | | 3 | 21 |
| | 28 | 1 | 22 |
| | | 2 | 23 |
| | | 3 | 24 |
| | 30 | 1 | 25 |
| | | 2 | 26 |
| | | 3 | 27 |
| 70 | 26 | 1 | 28 |
| | | 2 | 29 |
| | | 3 | 30 |
| | 28 | 1 | 31 |
| | | 2 | 32 |
| | | 3 | 33 |
| | 30 | 1 | 34 |
| | | 2 | 35 |
| | | 3 | 36 |

FIG. 39

| Trial | No Cover Area Under Curve | Signal Mean | STDEV |
|---|---|---|---|
| 1 | 26364975.15 | 802294.5 | 0.804 |
| 2 | 24624107.50 | -938573.2 | -0.940 |
| 3 | 23707844.02 | -1854836.6 | -1.858 |
| 4 | 25976408.57 | 413727.9 | 0.414 |
| 5 | 24750387.82 | -812292.8 | -0.814 |
| 6 | 26902131.54 | 1339450.9 | 1.342 |
| 7 | 24483206.29 | -1079474.4 | -1.081 |
| 8 | 26614155.94 | 1051475.3 | 1.053 |
| 9 | 23071267.19 | -2491413.5 | -2.496 |
| 10 | 25568339.17 | 5658.5 | 0.006 |
| 11 | 25740257.22 | 177576.6 | 0.178 |
| 12 | 24152528.12 | -1410152.5 | -1.413 |
| 13 | 24776299.36 | -786381.3 | -0.788 |
| 14 | 24512255.60 | -1050425.1 | -1.052 |
| 15 | 25243829.30 | -318851.4 | -0.319 |
| 16 | 24883827.60 | -678853.1 | -0.680 |
| 17 | 26234738.41 | 672057.7 | 0.673 |
| 18 | 25978265.07 | 415584.4 | 0.416 |
| 19 | 25489314.39 | -73366.3 | -0.073 |
| 20 | 25574291.02 | 11610.4 | 0.012 |
| 21 | 26661350.12 | 1098669.5 | 1.101 |
| 22 | 26080159.40 | 517478.7 | 0.518 |
| 23 | 25827666.51 | 264985.8 | 0.265 |
| 24 | 26716562.56 | 1153881.9 | 1.156 |
| 25 | 25907439.33 | 344758.7 | 0.345 |
| 26 | 24904351.10 | -658329.6 | -0.659 |
| 27 | 26845677.91 | 1282997.2 | 1.285 |
| 28 | 26196761.29 | 634080.6 | 0.635 |
| 29 | 27039912.69 | 1477232.0 | 1.480 |
| 30 | 26052109.68 | 489429.0 | 0.490 |

FIG. 41A

RADAR Beam Forming Using Silicon Carbide Absorption

| Frequency GHz | Wavelength mm | Silicon Carbide Particle Size microns | Ratio of Particle Size to Wavelength | Silicon Carbide % fill by volume | Thickness of Absorptive Material | Ratio of Material Thickness to Wavelength | Shape of Opening in Absorptive Surface (round, square etc.) | Attenuation dB |
|---|---|---|---|---|---|---|---|---|
| 24 | 12.49 | 70 | .0056 | 28 | 3.15mm | 25% | tbd | -9.2 to -14.8 |

| SiC Density | 3.21 | grams/cc |
|---|---|---|

FIG. 45

RADAR SYSTEM AND ASSEMBLY

CROSS-REFERENCE TO RELATED APPLICATIONS

This application is a U.S. National Stage of International Application No. PCT/CA2020/050917, filed on Jul. 2, 2020, which claims the benefit of U.S. Provisional Application No. 62/869,775 filed Jul. 2, 2019 and U.S. Provisional Application No. 62/985,584 filed Mar. 5, 2020. The entire disclosure of the above applications being considered part of the disclosure of this application and hereby incorporated by reference.

FIELD

The present disclosure relates generally to radar sensors for motor vehicles and, more particularly, to a radar housing and antenna configured to project about a perimeter of a vehicle.

BACKGROUND

This section provides background information related to the present disclosure which is not necessarily prior art.

In motor vehicles such as minivans, sport utility vehicles and the like, it has become common practice to provide the vehicle body with a large rear opening. A liftgate (also referred to as a tailgate or closure panel) is typically mounted to the vehicle body or chassis with hinges for pivotal movement about a transversely extending axis between an open position and a closed position. Typically, the liftgate may be operated manually or with a power drive mechanism including a reversible electric motor.

Systems exist for providing assistance in opening or for automatically opening the liftgate of vehicles. These systems make use of manually-actuated remote controls and typically require at least one hand of a user or operator to be available. This can be problematic if the user is carrying a load to be placed in the vehicle via the liftgate. In addition, systems exist which use sensors mounted under the rear bumper of the vehicle which may be activated to open the liftgate by a user waving their foot under the bumper. However, these systems can be complex, particularly when attempting to avoid unintentional operation.

In view of the above, there remains a need to develop a sensor that can accurately detect objects within a predetermined region about a perimeter of a vehicle while preventing false triggers due to presence of objects outside of the predetermined region.

SUMMARY

This section provides a general summary of the present disclosure and is not a comprehensive disclosure of its full scope or all of its features, aspects and objectives.

It is an aspect of the present disclosure to provide a sensor for a motor vehicle that comprises a radar housing and an antenna disposed within the radar housing and which is configured to project radio frequency (RF) energy through a field of view (FOV) to detect an object or a gesture within a footprint of the motor vehicle. It is also an aspect for the antenna to be configured to prevent the FOV from extending outside of the footprint of the motor vehicle.

It is also an aspect of the present disclosure to provide a sensor in which the FOV is controlled by a design of the antenna. Specifically, it is an aspect of the present disclosure to provide a steered antenna to control the FOV.

In another aspect of the disclosure, the sensor can include a bracket configured to hold and to position the radar housing for controlling the field of view.

In another aspect of the disclosure, the bracket is adjustable.

In another aspect of the disclosure, the bracket is not adjustable.

In another aspect of the disclosure, the antenna is disposed at an oblique angle within the housing to control the field of view.

In another aspect of the disclosure, the antenna comprises an array of antenna elements configured to control the field of view.

In another aspect of the disclosure, the antenna elements are arranged as a linear array to provide the field of view extending substantially along a major axis.

In another aspect of the disclosure, the antenna elements are formed from rectangular conductive regions in a generally flat plane and spaced apart from one another by a regular spacing.

In another aspect of the disclosure, the linear array of the antenna elements defines a 4×1 pattern.

In another aspect of the disclosure, the antenna is configured to steer a produced radiation pattern to control the field of view.

In another aspect of the disclosure, the antenna is a transmitting antenna, and wherein the sensor also comprises a receiving antenna configured to receive radio frequency radiation.

In another aspect of the disclosure, the transmitting antenna and the receiving antenna each have a same configuration.

In another aspect of the disclosure, the field of view is configured to extend along a length of a bumper of the motor vehicle.

In another aspect of the disclosure, the radar housing is disposed adjacent to an inner surface of a bumper of the motor vehicle.

In another aspect of the disclosure, the sensor further includes a seal between the radar housing and the inner surface of the bumper, wherein the seal is configured to prevent debris from entering between the antenna and the bumper.

In another aspect of the disclosure, the radar housing includes a vent filter being impermeable to liquids and permeable to air.

In another aspect of the disclosure, the vent filter comprises Gore-Tex material.

In another aspect of the disclosure, the antenna elements extend substantially along the major axis provided perpendicular to an outer perimeter of the vehicle.

In another aspect of the disclosure, the radar housing is disposed adjacent to and flush against an inner surface of a vehicle component of the motor vehicle.

In another aspect of the disclosure, the radar housing is disposed adjacent to and flush against an inner surface of a vehicle component of the motor vehicle without a gap between the housing and the inner surface.

It is also an aspect of the present disclosure to provide a sensor configured to prevent debris or moisture from intruding between a housing of the sensor and an inner surface of a bumper of the motor vehicle. Specifically, it is an aspect to seal the housing against the inner surface of the bumper to prevent intrusion of debris.

It is also an aspect of the present disclosure to provide method of operating a radar sensor for a motor vehicle to sense at least one of a gesture and an object next to the motor vehicle. The method includes the step of mounting a radar housing on the motor vehicle. The radar housing has an antenna disposed within the radar housing. The next step of the method is configuring the antenna to project radio frequency energy through a field of view to detect the object or the gesture within a footprint of the motor vehicle. The antenna is configured to prevent the field of view from extending outside of the footprint of the motor vehicle.

It is a further object of the present disclosure to provide a sensor for a closure panel of a motor vehicle for sensing at least one of an object and a motion adjacent the closure panel to facilitate operation of the closure panel. The sensor includes a radar housing and a radar antennae disposed in the housing. The antennae configured to sense at least one of an object and a motion adjacent the closure panel and to output data corresponding to at least one of an object and motion. A radar absorber is operably attached to the radar housing. The radar absorber is configured to shape a radar beam emitted from the radar emitting sensor.

DRAWINGS

These and other aspects, features, and advantages of the present disclosure will be readily appreciated, as the same becomes better understood by reference to the following detailed description when considered in connection with the accompanying drawings wherein:

FIG. 1A is a perspective view of an example motor vehicle equipped with a user-activated, non-contact power closure member system for opening a rear liftgate of the vehicle which shows the location of at least one sensor in accordance with some aspects of the present disclosure;

FIG. 1B is a perspective exploded view of a bumper of the example motor vehicle of FIG. 1A;

FIG. 3 is an exploded view of the first example sensor and mounting bracket in accordance with aspects of the disclosure;

FIG. 6 is an exploded view of a fourth example sensor in accordance with aspects of the disclosure;

FIG. 7 is a perspective view of the fourth example sensor of FIG. 6 in accordance with aspects of the disclosure;

FIG. 8 is a cross-sectional view of the fourth example sensor of FIG. 6 in accordance with aspects of the disclosure;

FIG. 14 is a schematic bottom view of a bumper of a motor vehicle showing fields of view of two sensors in accordance with aspects of the disclosure;

FIG. 15 is a schematic side view of a bumper of a motor vehicle showing a field of view of a sensor in accordance with aspects of the disclosure;

FIG. 16 is a schematic rear view of a bumper of a motor vehicle showing a field of view of a sensor in accordance with aspects of the disclosure;

FIG. 17 is a perspective cut-away view of the bumper of the motor vehicle showing a field of view of a fifth example sensor in accordance with aspects of the disclosure;

FIG. 18A is a schematic side view of the bumper of the motor vehicle showing a field of view of a sensor in accordance with aspects of the disclosure;

FIG. 18C is a schematic side view of the bumper of the motor vehicle showing a field of view of a sensor tilted outwardly relative to FIG. 18A in accordance with aspects of the disclosure;

FIG. 21A is an enlarged view of antenna of FIG. 21, in accordance with an illustrative embodiment;

FIG. 21B is an S-parameter graph showing magnitudes in dB, in accordance with an illustrative embodiment;

FIG. 24A is a bottom view of the sensor controller in accordance with aspects of the disclosure;

FIG. 24B is a top view of the sensor controller of FIG. 24A in accordance with aspects of the disclosure;

Figure 25A:
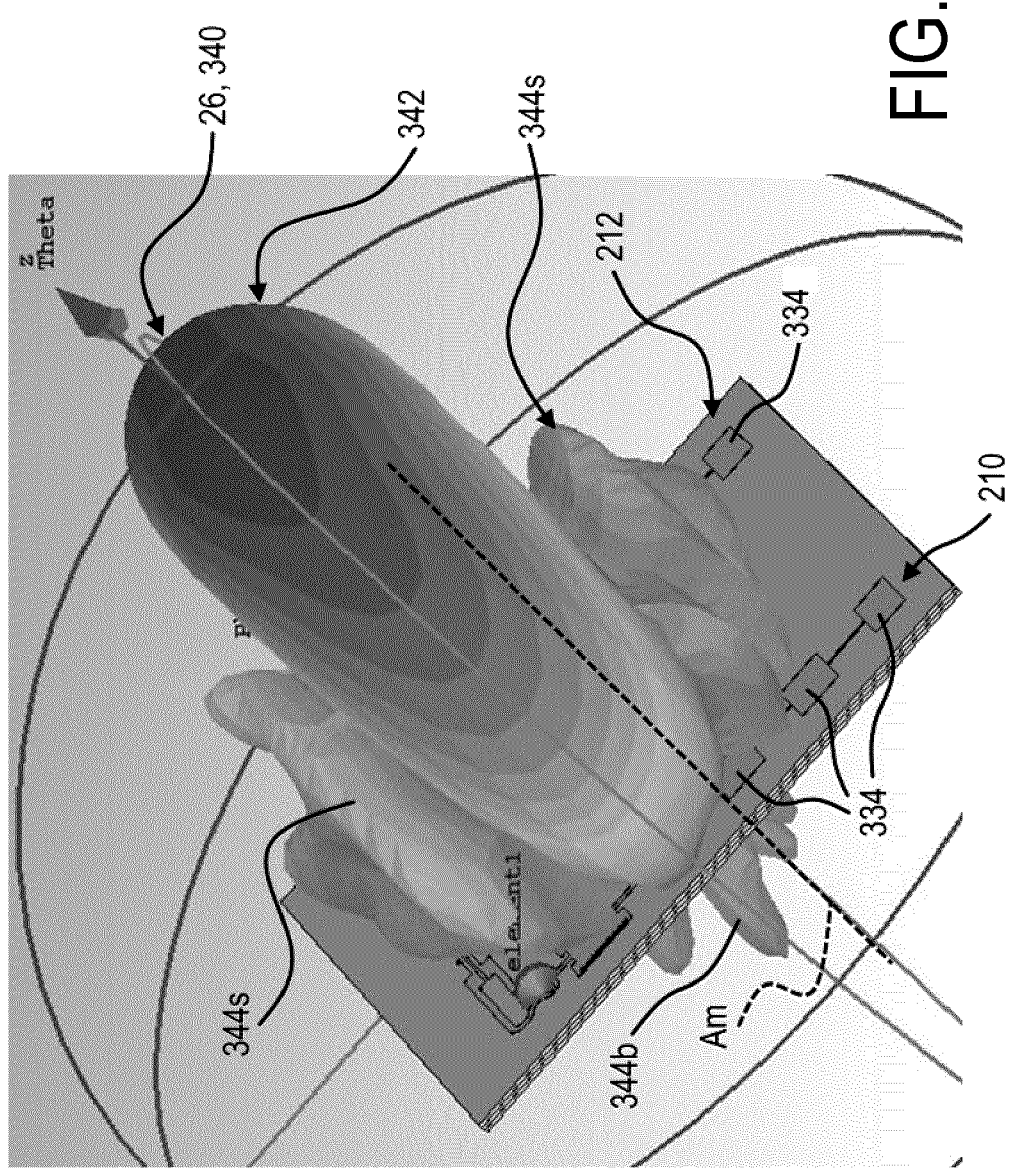
FIG. 25A is a perspective view of the printed circuit board of FIG. 25A with a graphic representation of a radiation pattern generated therefrom.
Figure 25C:
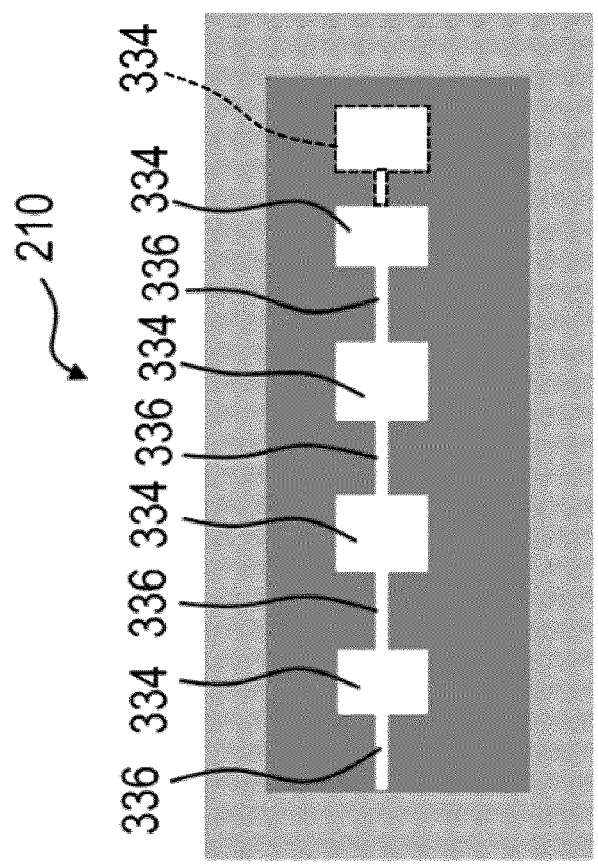
FIG. 25C is a schematic top view of the transmitting antenna of FIG. 25A.
Figure 25B:
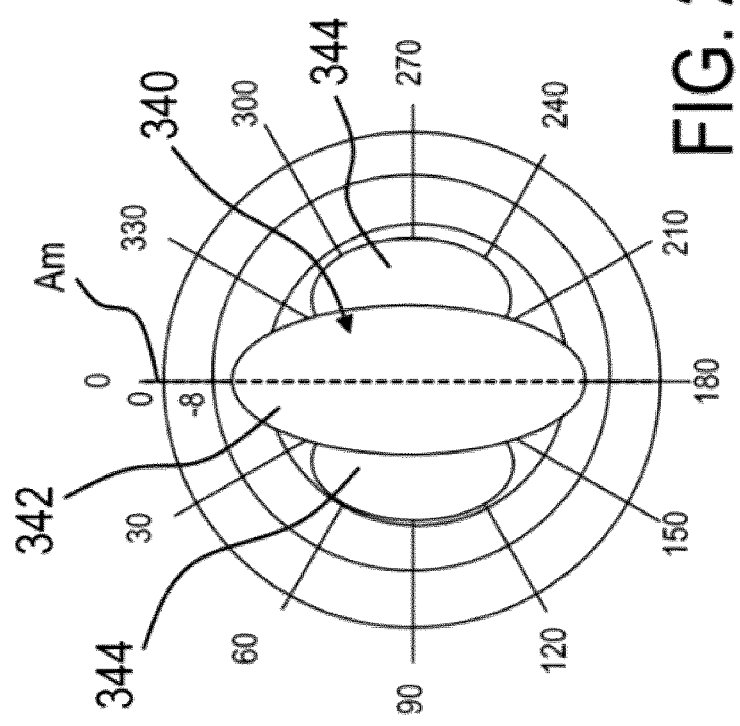
FIG. 25B is a graphic view of the radiation pattern generated by the transmitting antenna of FIG. 25A.
Figure 25E:
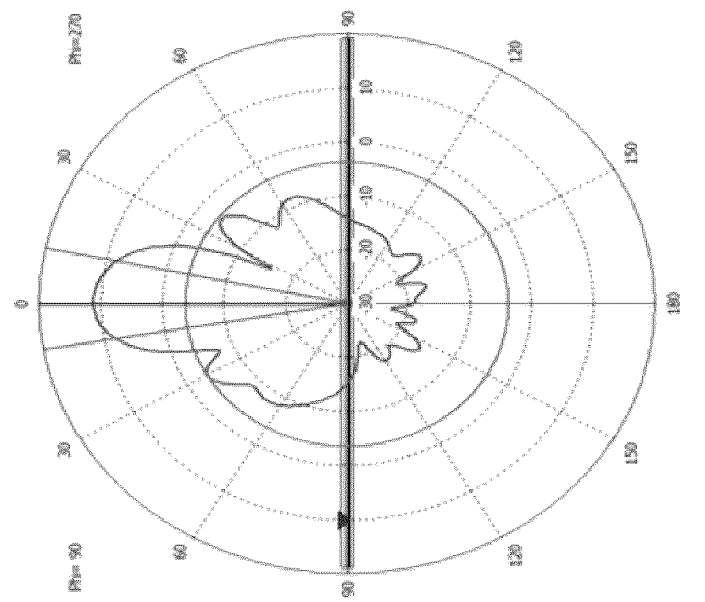
Figure 25D:
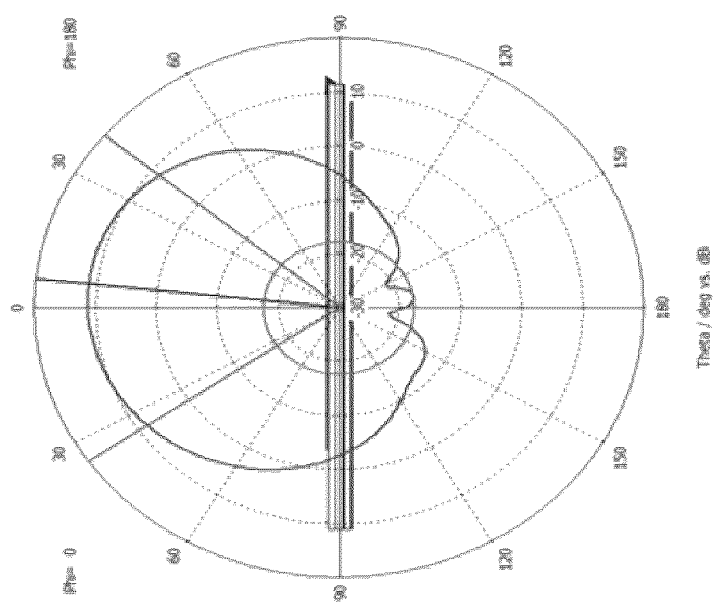
Figure 25G:
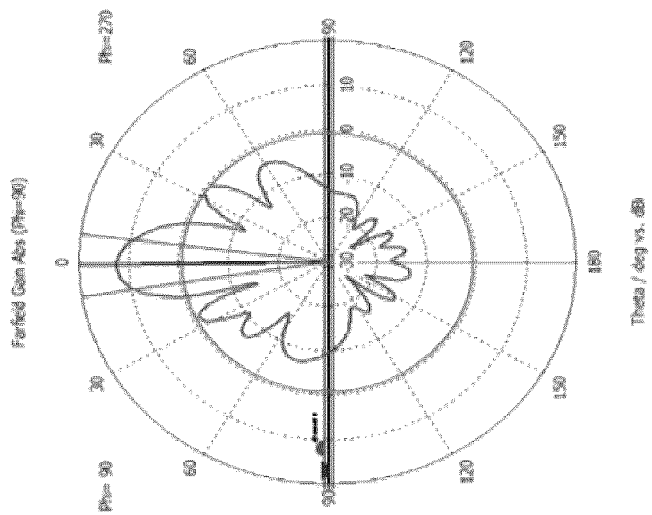
Figure 25F:
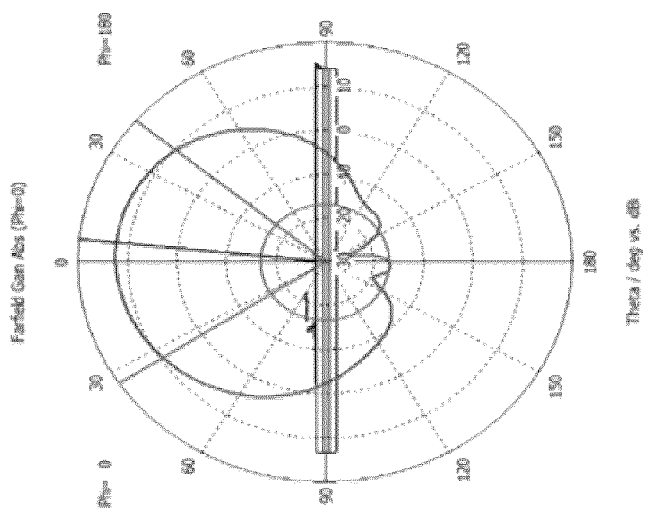
Figure 26A:
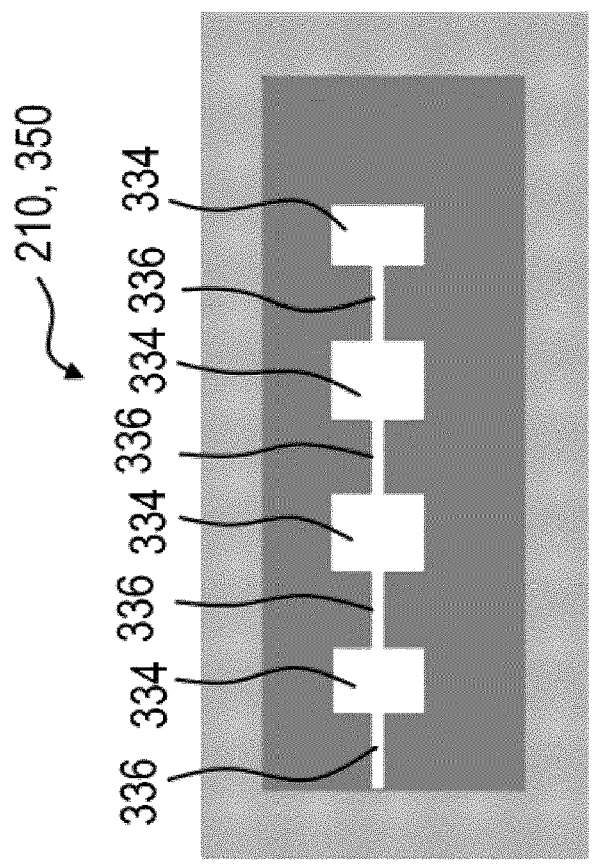
Figure 26B:
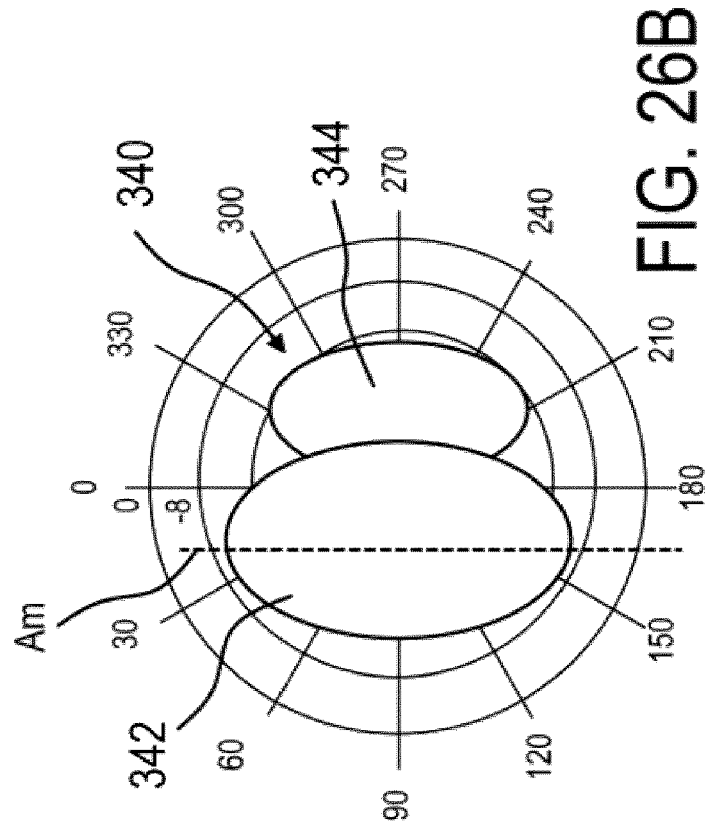
Figure 27A:
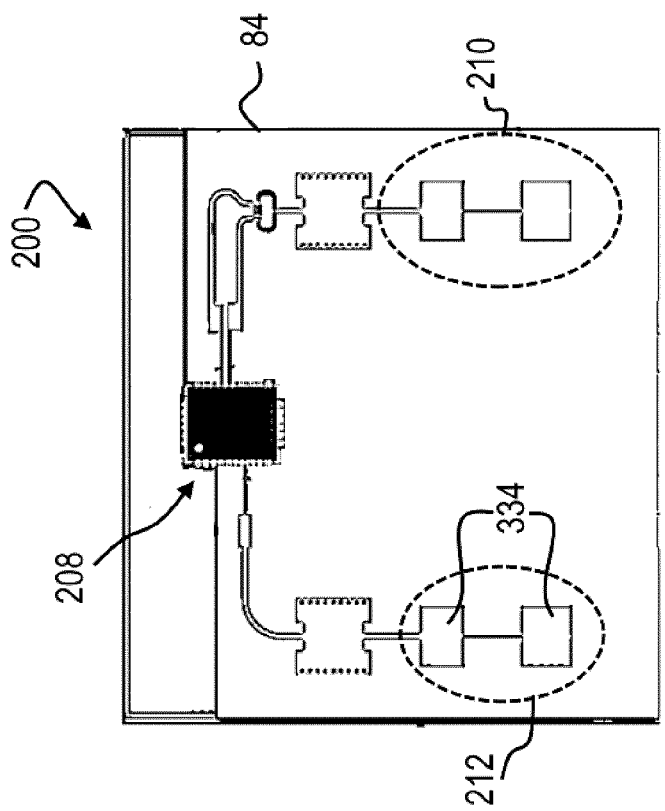
Figure 27B:
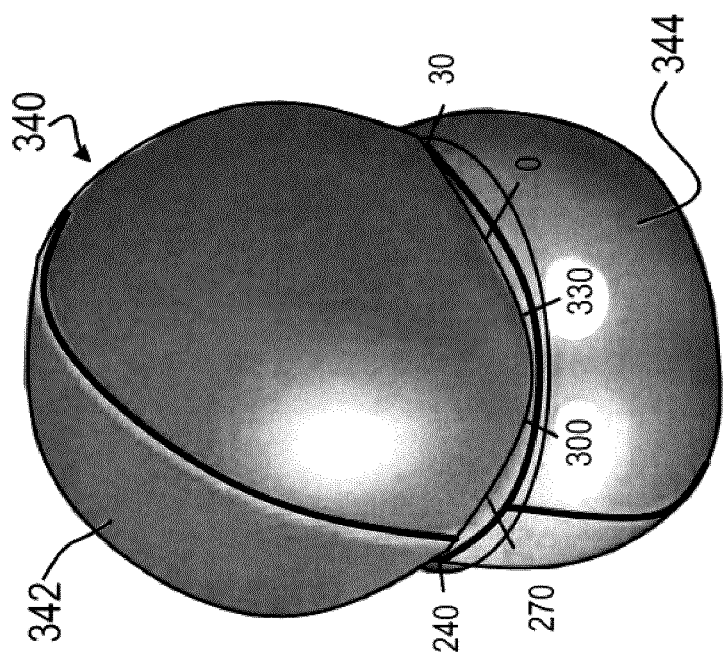
Figure 32:
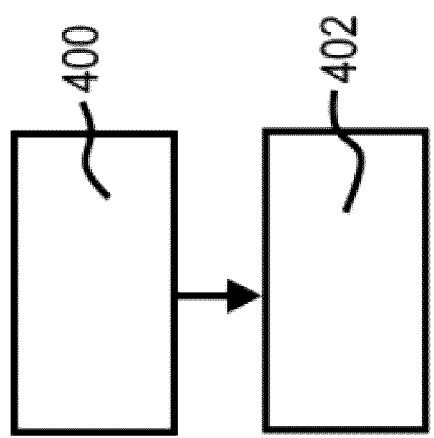

FIGS. 25D and E are farfield gain graphs of a 4×1 transmit antenna design, in accordance with aspects of the disclosure;

FIGS. 25F and 25G are farfield gain graphs of a 5×1 transmit antenna design, in accordance with aspects of the disclosure;

FIG. 26A is a schematic top view of a steered patch antenna in accordance with aspects of the disclosure;

FIG. 26B is a graphic view of a radiation pattern generated by the steered patch antenna of FIG. 26A;

FIG. 27A is a perspective view of the printed circuit board including the transmitting antenna and the receiving antenna in accordance with aspects of the disclosure;

FIG. 27B is a graphic view of a radiation pattern generated by the transmitting antenna of FIG. 26A;

FIG. 28 is a schematic top view of the bumper of the motor vehicle showing the field of view of the sensor in accordance with aspects of the disclosure;

FIG. 29A is a schematic side view of the bumper of the motor vehicle showing the field of view of the sensor having the steered antenna in accordance with aspects of the disclosure;

FIG. 29B is a schematic side view of the bumper of the motor vehicle showing the field of view of the sensor of FIG. 29A shifted from the location of the disclosure;

FIG. 30 is a cut-away side view of the sensor within the bumper of the motor vehicle in accordance with aspects of the disclosure;

FIG. 30A is a cut-away side view of the sensor having an irregular air gap between the bumper of the motor vehicle in accordance with aspects of the disclosure;

FIG. 31 is a cut-away side view of the sensor within the bumper of the motor vehicle in accordance with aspects of the disclosure;

FIG. 32 illustrates steps of a method of operating a radar sensor for the motor vehicle to sense at least one of a gesture and an object next to the motor vehicle in accordance with aspects of the disclosure;

FIG. 33A is a cross-sectional view of the radar sensor with a first exemplary radar absorber for beam forming using silicon carbide absorption according to aspects of the disclosure;

FIG. 33B is a bottom view of the radar sensor with the first exemplary radar absorber according to aspects of the disclosure;

FIG. 34A is a cross-sectional view of the radar sensor with a second exemplary radar absorber for beam forming using silicon carbide absorption according to aspects of the disclosure;

FIG. 34B is a bottom view of the radar sensor with the second exemplary radar absorber according to aspects of the disclosure;

FIG. 35 is a table showing a testing plan of the radar absorbers according to aspects of the disclosure;

FIGS. 36A-36D illustrate a mold used in the testing plan according to aspects of the disclosure;

FIG. 37 illustrates a thickness of the radar absorber according to aspects of the disclosure;

FIGS. 38A-38C illustrate aperture shape and size options for the radar absorber according to aspects of the disclosure;

FIG. 39 shows limitations of usage that are evaluated according to aspects of the disclosure;

FIGS. 40A-40D show an arrangement of a housing, mold, and radar according to aspects of the disclosure; and FIGS. 41A-41B, 42A-42E, 43, 44, 45, and 46A-46B show evaluation results according to aspects of the disclosure.

DETAILED DESCRIPTION

In general, several example embodiments of sensors and systems for use of such sensors thereof constructed in accordance with the teachings of the present disclosure will now be disclosed. Each of the example embodiments is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

Referring initially to FIG. 1A, an example motor vehicle 12 is shown to include a closure member or closure being a rear liftgate 14 mounted to a vehicle body 16. According to the example embodiment described in the present disclosure, the non-contact object and/or gesture detection system 10 is integrated into a rear bumper 18 of the vehicle body 16 and used for controlling movement of the rear liftgate 14. However, the non-contact object and/or gesture detection system 10 could be placed at another location, for example, and used for the rear liftgate 14 or used for a different closure member.

The non-contact object and/or gesture detection system 10 includes at least one sensor 20, 20', 20", 20''', 20'''', 20''''' which senses an object or motion when a key fob 22 associated with the specific vehicle 12 is located within a predetermined distance of the vehicle 12, for example when the key fob 22 is in possession of a user 24 approaching the vehicle 12. Although the key fob 22 is used in the example embodiment, another component associated with the specific vehicle 12 and which can be detected by the vehicle 12 could be used or it may be possible to otherwise initialize the system 10 without using the key fob 22. An example of the object detected by the at least one sensor 20, 20', 20", 20''', 20'''', 20''''' is a foot 150 of the user 24 (FIGS. 18A-18C), and an example of the motion detected by the at least one sensor 20, 20', 20", 20''', 20'''', 20''''' is a kicking or waving motion of the user 24. It should be appreciated that other objects and/or motions may be alternatively utilized.

The sensor 20, 20', 20", 20''', 20'''', 20''''' is configured to detect an object or motion within a field of view (FOV) 28 beneath the bumper 18. In some embodiments, the sensor 20, 20', 20", 20''', 20'''', 20''''' emits radio frequency (RF) radiation 26 for sensing the object or motion within the field of view FOV 28. The field of view 28 may be defined by the control of the shape or pattern of the radiation beam generated by the sensor in manners as will be described in more details herein below. The frequency of the radiation 26 may be in the bandwidth ranging between 23.5 GHz and 24 GHz, or within the 76 to 77 GHz frequency range as examples but without limitation.

It should be appreciated that the rear bumper 18 is merely an example application of the sensors 20, 20', 20", 20''', 20'''', 20''''' and/or systems 10 provided in this disclosure may be applied to a variety of applications including vehicular and non-vehicular applications. In vehicular applications, the subject sensors 20, 20', 20", 20''', 20'''', 20''''' and/or systems 10 may be used for a variety of different closure members including passenger or cargo doors and/or windows. Alternatively or additionally, the subject sensors 20, 20', 20", 20''', 20'''', 20''''' and systems 10 may be used for applications not related to closure members such as, for example, for non-contact control of drinking fountains or hand washing sinks.

FIG. 1B shows detail of the bumper 18 including an outer fascia 30, that is visible to the user 24 in normal use, and which may be referred to simply as a "bumper." FIG. 1B also shows an inside trim 32 that is disposed within the outer fascia 30. The inside trim 32 may include a lower surface of the bumper 18 facing the ground.

Figure 2B:
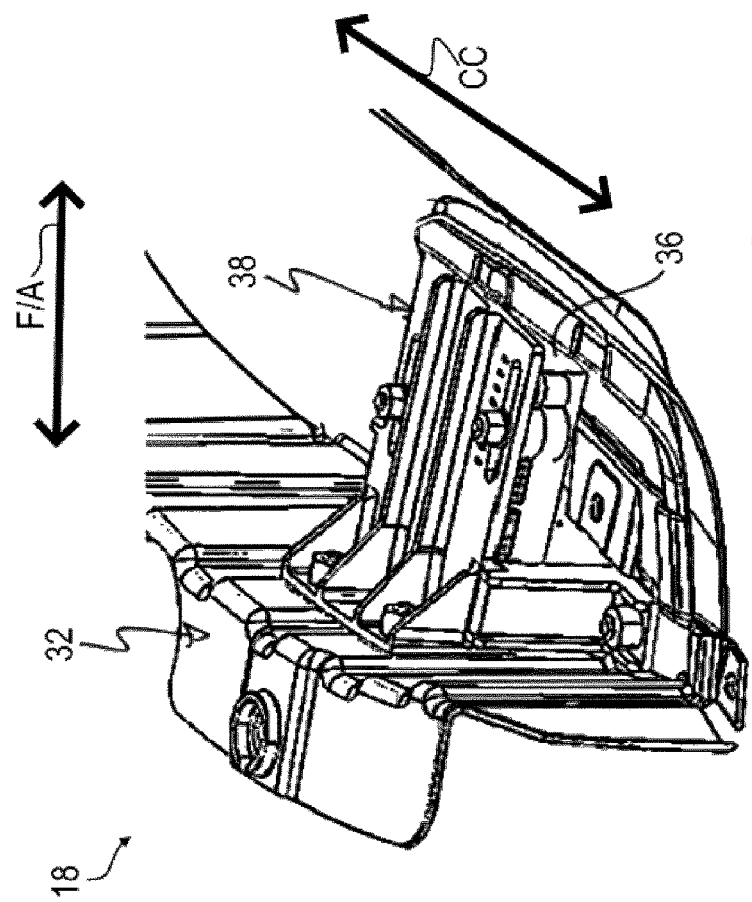
FIG. 2B is a perspective side view of the first example sensor within the bumper of FIG. 2A in accordance with aspects of the disclosure.
Figure 2A:
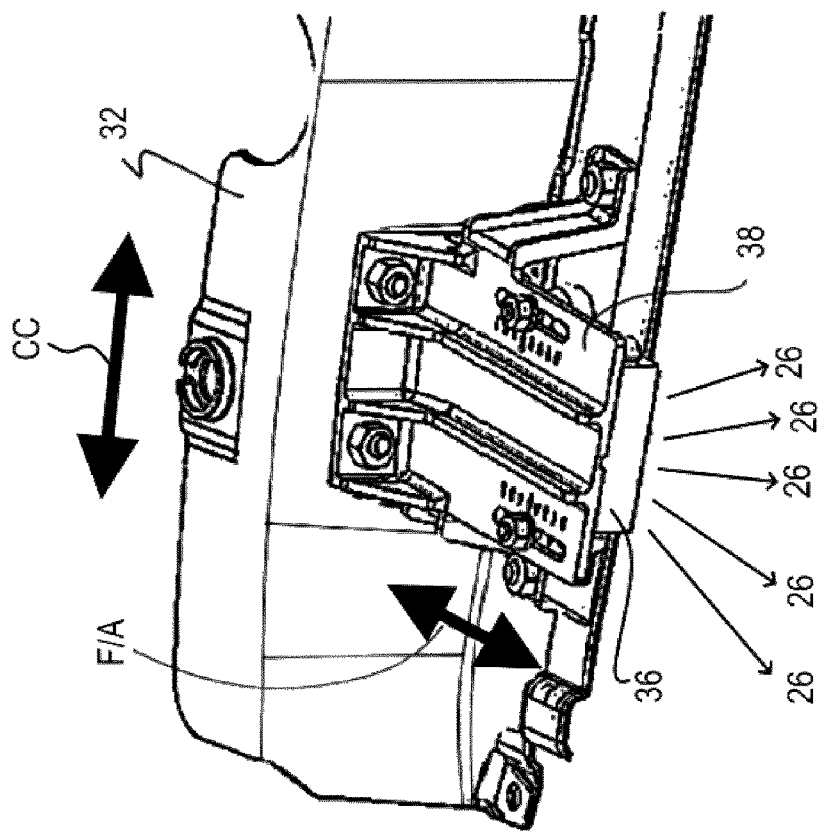
FIG. 2A is a perspective font view of a first example sensor within the bumper in accordance with aspects of the disclosure.

FIGS. 2A and 2B show an example sensor housing 36 of a first example sensor 20, within the bumper 18 in accordance with aspects of the disclosure. Specifically, FIGS. 2A and 2B show a mounting bracket 38 that mounts the sensor housing 36 to the inside trim 32 of the bumper 18, and which provides for adjustment of the sensor housing 36 in a fore/aft (i.e., longitudinal) direction as shown by the arrow FA. This adjustment may allow precise control of the FOV 28. The sensor housing 36 may also be called a radome, particularly in embodiments where the sensor 20, 20', 20'', 20''', 20'''', 20''''' uses RF or Radar sensing.

FIG. 3 is an exploded view of the first example sensor 20 and mounting bracket 38 in accordance with aspects of the disclosure. Specifically, the mounting bracket 38 includes a top plate 39 that extends generally horizontally, with two stiffening ribs 40 extending therealong spaced and parallel to one-another. A pair of legs 41 extends outwardly and downwardly from the top plate 39. Each of the legs 41 defines a foot 42 that extends outwardly from an end thereof opposite the top plate 39. The feet 42 may each define mounting holes for receiving fasteners for securing the mounting bracket 38 to the bumper 18. The mounting bracket 38 also includes an upright plate 43 supported by a plurality of triangular gussets 44. The upright plate 43 also defines mounting holes for receiving fasteners to secure the mounting bracket 38 to the bumper 18.

From the top, the first example sensor 20 includes (e.g., as part of the sensor housing 36) a set of mounting nuts 44 (e.g., two M6 nuts), which may be made of metal or plastic or nylon; the mounting bracket 38, a set of four cover screws 45 (e.g., four M3 screws); a cover 46, which may include a seal or gasket for preventing moisture or other contaminants from entering the first example sensor 20. The first example sensor 20 also includes a printed circuit board (PCB) 47, which may also be called an electronic control unit (ECU); wiring seals 48, 49 (e.g., seal for four wires 48 and seal for three wires 49) for sealing wiring connections preventing and moisture or other contaminants from entering the first example sensor 20; a set of two mounting screws 50 (e.g., two M6 screws), which may be made of metal, plastic, or nylon, for threading into the mounting nuts 44 and thus holding the first example sensor 20 to the mounting bracket 38. The first example sensor 20 also includes a housing 51 having a rectangular box shape with an open top; and a set of cover nuts 52 (e.g., four M3 nuts) configured to threadedly receive corresponding ones of the cover screws 45 for securing the cover 46 upon the housing 51. Seven 22 gauge (i.e., AWG 22) wires are also included, but not shown in FIG. 3.

In some embodiments, such as is shown in FIG. 3, the bracket 38 is adjustable for controlling a position and/or angle of the sensor housing 36 and thus controlling a location and/or direction of the FOV 28. Alternatively, in some embodiments, the bracket 38 may not be adjustable.

Figure 4:
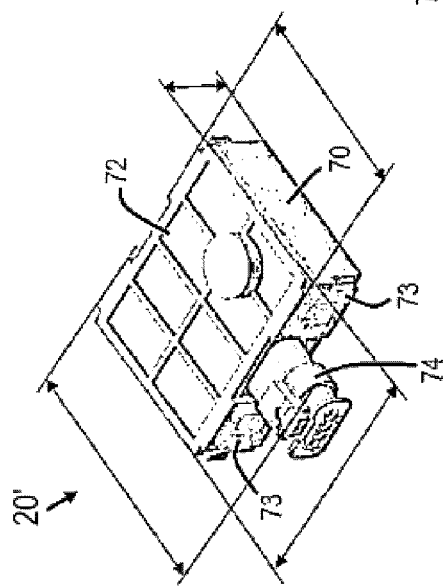
FIG. 4 is a perspective view of a second example sensor in accordance with aspects of the disclosure.
Figure 13:
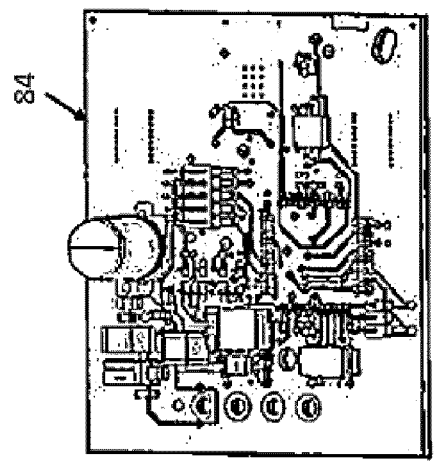
FIG. 13 is a perspective view of the printed circuit board of the fourth example sensor of FIG. 6 in accordance with aspects of the disclosure.
Figure 11:
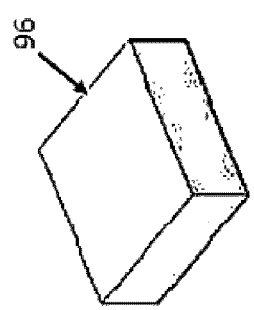
FIG. 11 is a perspective view of an isolator of the fourth example sensor of FIG. 6 in accordance with aspects of the disclosure.
Figure 12:
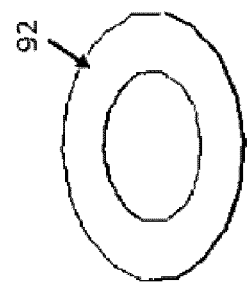
FIG. 12 is a perspective view of the vent filter of the fourth example sensor of FIG. 6 in accordance with aspects of the disclosure.
Figure 9:
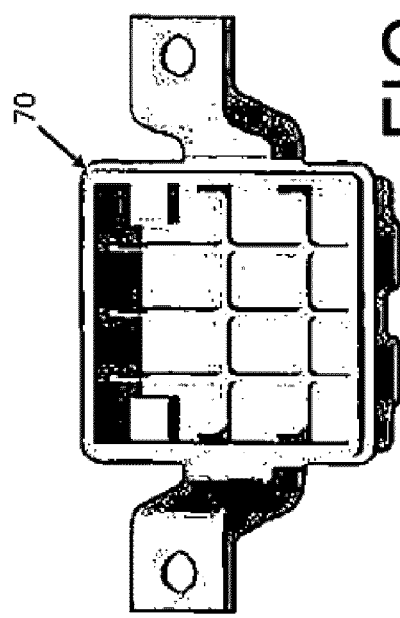
FIG. 9 is a perspective view of the housing of the fourth example sensor of FIG. 6 in accordance with aspects of the disclosure.
Figure 10:
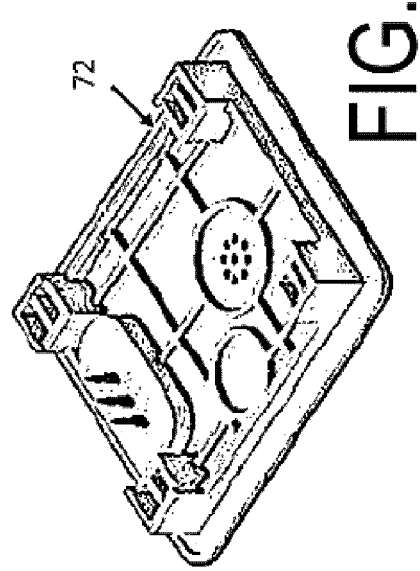
FIG. 10 is a perspective view of the cover of the fourth example sensor of FIG. 6 in accordance with aspects of the disclosure.

FIG. 4 is a perspective view of a second example sensor 20' in accordance with aspects of the disclosure. Specifically, the second example sensor 20' is similar in construction to the first example sensor 20 discussed, above. However, the second example sensor 20' includes a cover 72 configured to enclose and seal a housing 70 with a plurality of closure tabs 73 integrally formed with the cover 72 for engaging corresponding protrusions in the housing 70. An electrical connector 74, such as a plug-in connector, extends from a side of the housing 70.

Figure 5:
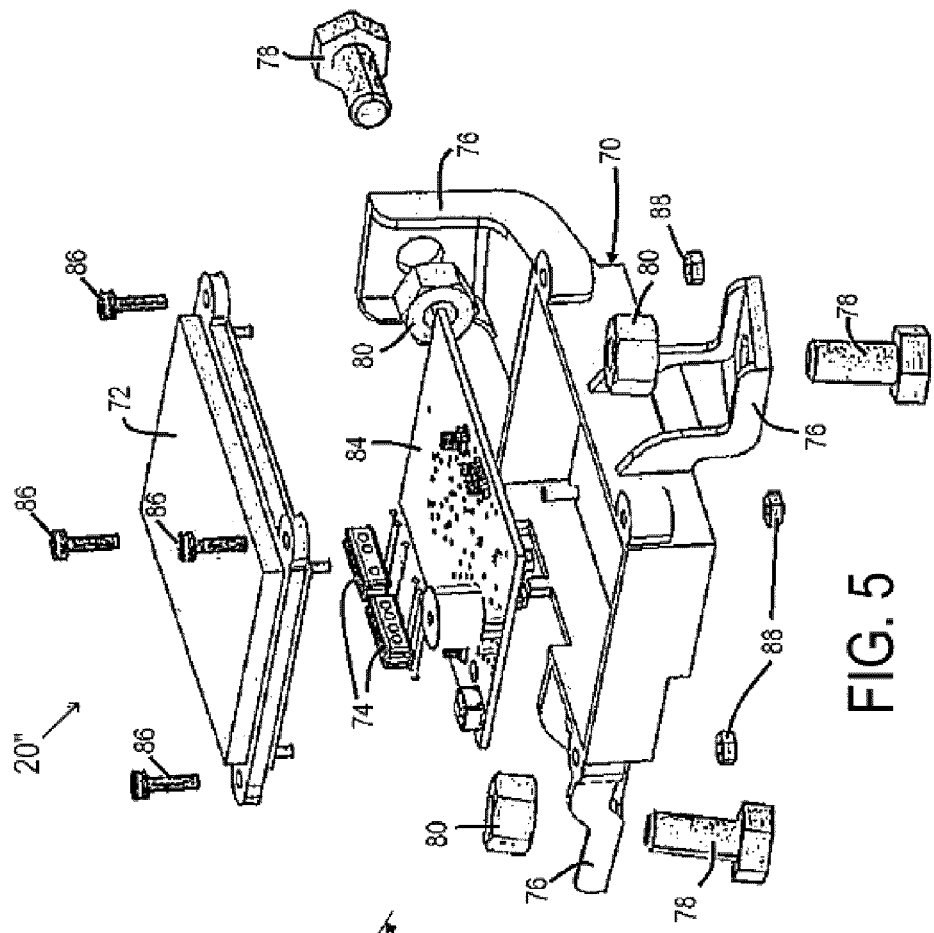
FIG. 5 is an exploded view of a third example sensor in accordance with aspects of the disclosure.

FIG. 5 is an exploded view of a third example sensor 20'' in accordance with aspects of the disclosure. The third example sensor 20'' includes the housing 70 having a rectangular box shape with an open top. The cover 72 is configured to enclose and seal the open top of the housing 70. The housing 70 defines a three different mounting flanges 76 extending outwardly therefrom for receiving fasteners, such as mounting bolts 78, to mount the third example sensor 20'' to the bumper 18. The third example sensor 20'' also includes the electrical connector 74 extending through the housing 70. A printed circuit board 84 is disposed within the housing 70.

FIGS. 6-13 show various aspects and components of a fourth example sensor 20''' in accordance with aspects of the disclosure. Specifically, the fourth example sensor 20''' includes the cover 72 defining the electrical connector 74 and which encloses an open edge of the box-shaped housing 70. In some embodiments, the cover 72 is welded to the housing 70. The cover 72 is welded to the housing 70 and may sealingly close the housing using other means including one or more gaskets, adhesives, fasteners, straps, etc. The housing 70 includes two mounting flanges 76 for mounting the fourth example sensor 20''' to the bumper 18. The printed circuit board 84 is disposed within the housing 70. A vent filter 92 is disposed within the housing 70 adjacent to and sealed against a set of vent holes 94 in the cover 72. The vent filter 92 may be made of a material that is impermeable to liquids, such as water, but which is breathable, allowing air to pass through. The vent filter 92 may, therefore allow for airflow to cool internal components, such as the PCB 84 and/or electrical components within the housing 70. The vent filter 92 may be made of a woven or non-woven fabric, such as Gore-tex or Tyvek. The fourth example sensor 20''' also includes four isolators 96 which may be formed of resilient material, such as rubber or foam. The isolators 96 may be disposed between the PCB 84 and the housing 70 and/or between the PCB 84 and the cover 72 to cushion the PCB 84 and to provide isolation and/or dampening from vibration.

FIG. 14 is a schematic bottom view of the bumper 18 of the motor vehicle showing fields of view (FOVs) 28 of two sensors 20, 20', 20'', 20''', 20'''', 20''''' in accordance with aspects of the disclosure. Specifically, FIG. 14 shows the sensors 20, 20', 20'', 20''', 20'''', 20''''' mounted to the inside trim 32 within the outer fascia 30 of the bumper 18. FIG. 14 also shows each of the FOVs 28 being adjustable to define shifted FOVs 28'. These shifted FOVs 28' may result, for example, by adjusting a position and/or tilt of the sensors 20, 20', 20'', 20''', 20'''', 20''''', for example, by adjusting a position of the corresponding sensor housings 36 upon their brackets 38 as shown in FIGS. 2A-2B.

FIG. 15 is a schematic side view of the bumper 18 of the motor vehicle 12 showing the field of view 28 of the sensor 20, 20', 20'', 20''', 20'''', 20''''' in accordance with aspects of the disclosure. The projected radio frequency energy 26 is illustratively projected as a beam having a pattern that is wide in the cross-car (CC) direction (see FIG. 16) and narrow in the fore/after (F/A) direction (see FIG. 14) in the configuration as shown where the beam is projected about the vehicle bumper and as viewed from the rear of the vehicle 12, or generally the beam will have a wider pattern extending parallel to a side of the vehicle 12 (see FIGS. 17 and 28 as examples). Specifically, FIG. 15 shows the field of view 28 contained within a footprint 142 of the vehicle 12 and not protruding outwardly therebeyond. The term footprint of the vehicle is used herein to refer to the area defined by the four corners of the outer extent of the vehicle projected down on the ground below the vehicle, which may be the area directly beneath the vehicle, and may include some variation beyond this area without limiting the footprint for the purposes discussed herein. The field of view 28 may be generated in one possible configuration to not extend beyond such area or slightly extend beyond such area considering that any unintentional gestures or objects, such as the feet of pedestrians walking by the vehicle 12, as may be the case of a person trying to navigate between vehicles in a cramped parking lot, or that of a shopping cart being pushed past the vehicle, may not usually be proximate the vehicle so closely enough as to enter into the footprint of the vehicle, nor approach the vehicle 12 such that such gestures or objects are beneath the vehicle 12, where the field of view 28 may be limited to in one possible configuration of the sensor 20, 20', 20", 20'", 20"", 20""'. In another possible configuration, the field of view 28 may extend slightly beyond the footprint. The field of view 28 may also be configured so as not to extend fully beneath the vehicle 12. The field of view 28 may generally be directed downwardly towards the ground, and entirely, or partially beneath the vehicle 12, as compared to known obstacle detection sensors (non-gesture sensing detectors) and ADAS sensors as examples. Such an arrangement may, therefore, define a sensing area 144 beneath the vehicle 12 and a non-sensing area 146 outside of the footprint 142 of the vehicle 12. In other words, the FOV 28 may be adjusted such that it does not project beyond a peripheral edge 147 of the bumper 18. Thus, mistriggers or false triggers, that can result from the sensor 20, 20', 20", 20'", 20"", 20""' detecting objects or movements near the vehicle 12, can be minimized or prevented.

FIG. 16 is a schematic rear view of the bumper 18 of the motor vehicle 12 showing the field of view 28 of the sensor 20, 20', 20", 20'", 20"", 20""' in accordance with aspects of the disclosure. Specifically, FIG. 16 illustrates the field of view 28 extending for a width $w_1$ that is a substantial portion of the distance between the rear wheels 140. FIG. 16 illustrates that fields of view 28 that are substantially wide may be advantageous in that they can minimize the total coverage area. In some embodiments, such as is shown in FIG. 16, a single sensor 20, 20', 20", 20'", 20"", 20""' may be sufficient to provide a field of view 28 that is wide enough to be useful. Due to the wide field of view patterned about the perimeter of the vehicle, a single sensor 20, 20', 20", 20'", 20"", 20""' may be provided without requiring any identifying markers or indicators on the exterior of the vehicle 12 to signal to the user where to place their foot (body part) for the sensor to be able to detect the gesture made by the foot (or body part). For example, a wide field of view 28a may be provided as shown in FIG. 16 such that an object or obstacle e.g. a foot may be detected by a single sensor single sensor 20, 20', 20", 20'", 20"", 20""' positioned as shown in FIG. 16 when placed at either the left hand side or right hand side about the bumper 18. In other embodiments, two or more sensors 20, 20', 20", 20'", 20"", 20""' may be used to provide a wider field of view 28 and/or to provide redundant coverage.

FIG. 17 is a perspective cut-away view of the bumper 18 of the motor vehicle 12 showing the field of view 28 of a fifth example sensor 20"" ' in accordance with aspects of the disclosure. Specifically, FIG. 17 shows that the mounting bracket 38 may be adjusted to control the location and direction of the field of view 28 relative to the bumper 18. This adjustment may be used to prevent or to minimize the amount of the field of view 28 that extends outwardly beyond the footprint 142 of the bumper 18.

Figure 18B:
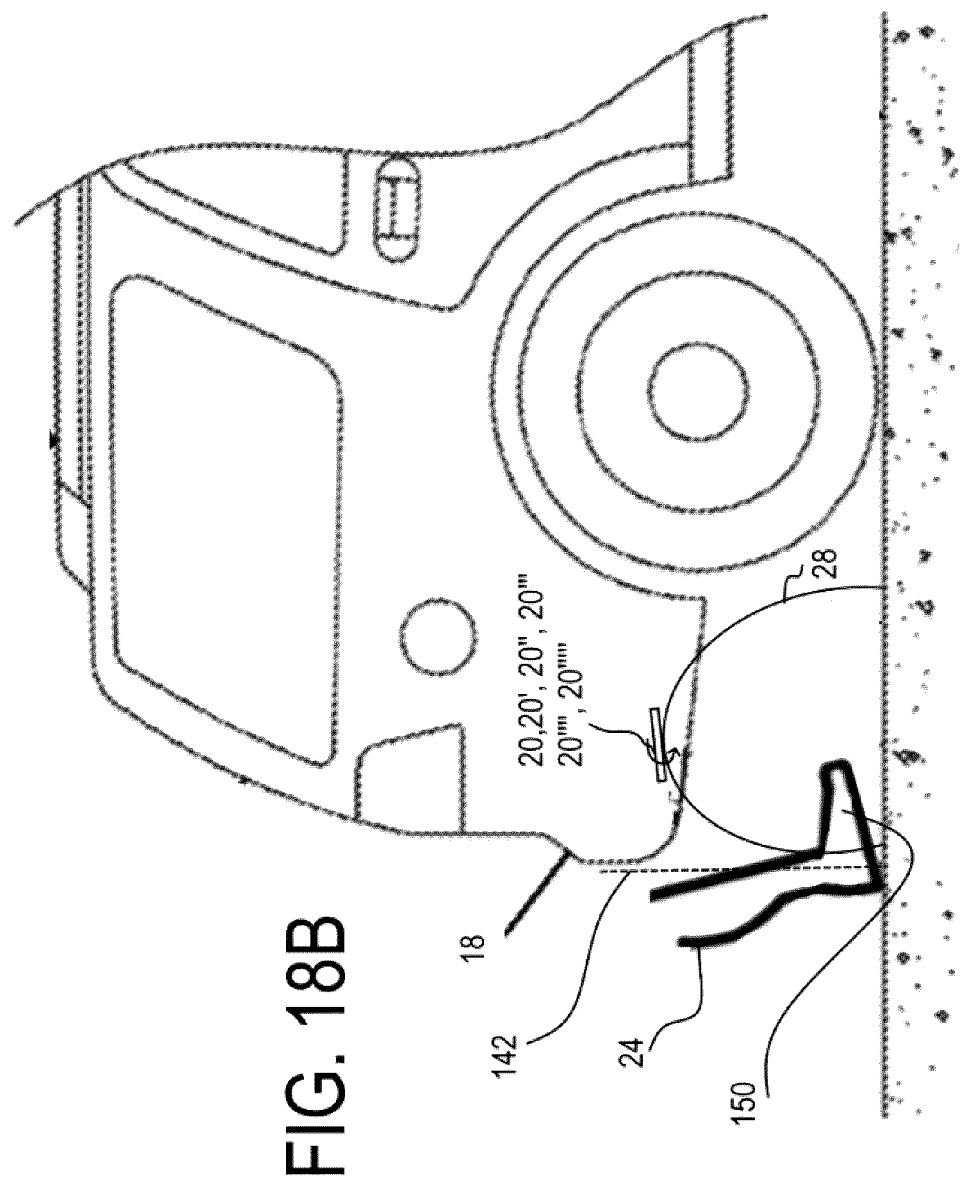
FIG. 18B is a schematic side view of the bumper of the motor vehicle showing a field of view of a sensor tilted inwardly relative to FIG. 18A in accordance with aspects of the disclosure.

FIGS. 18A-18C each show schematic side views of the bumper 18 of the motor vehicle 12 showing the field of view 28 of the sensor 20, 20', 20", 20'", 20"", 20""' in accordance with aspects of the disclosure. Specifically, FIG. 18A shows the sensor 20, 20', 20", 20'", 20"", 20""' pointed directly downwardly; FIG. 18B shows the sensor 20, 20', 20", 20'", 20"", 20""' tilted inwardly away from the edge of the footprint 142 of the bumper 18; and FIG. 18C shows the sensor 20, 20', 20", 20'", 20"", 20""' tilted outwardly toward the edge of the footprint 142 of the bumper 18. In other words, FIGS. 18A-18C show that the sensor 20, 20', 20", 20'", 20"", 20""' can be physically tilted to change the FOV 28 location. The FOV 28 is directed downwardly from the vehicle, for example towards the ground. FIGS. 18A-18C also show a foot 150 of the user 24 in various locations inside and outside of the FOV 28 to illustrate where the foot 150 can be detected by the sensor 20, 20', 20", 20'", 20"", 20""'. Alternatively or additionally, the FOV 28 can be adjusted by other means, such as through electronically steering the RF radiation and/or by using different antenna layouts. Such other means of adjusting the FOV 28 may allow the sensor 20, 20', 20", 20'", 20"", 20""' to be mounted to the bumper 18 using a fixed bracket 38.

Figure 19B:
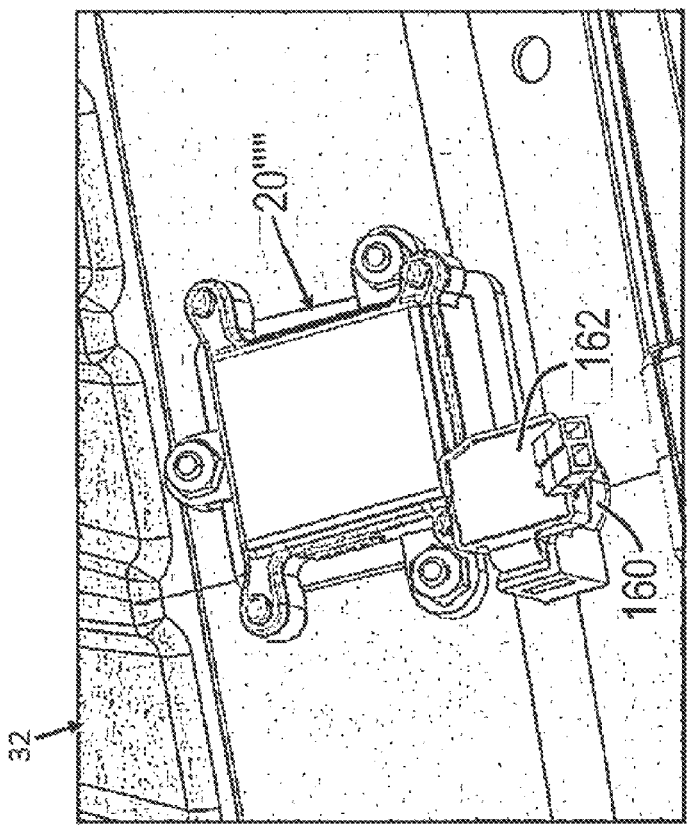
FIG. 19B is an inside perspective view of the sensor housing mounted within the inside trim piece of FIG. 19A in accordance with aspects of the disclosure.
Figure 19A:
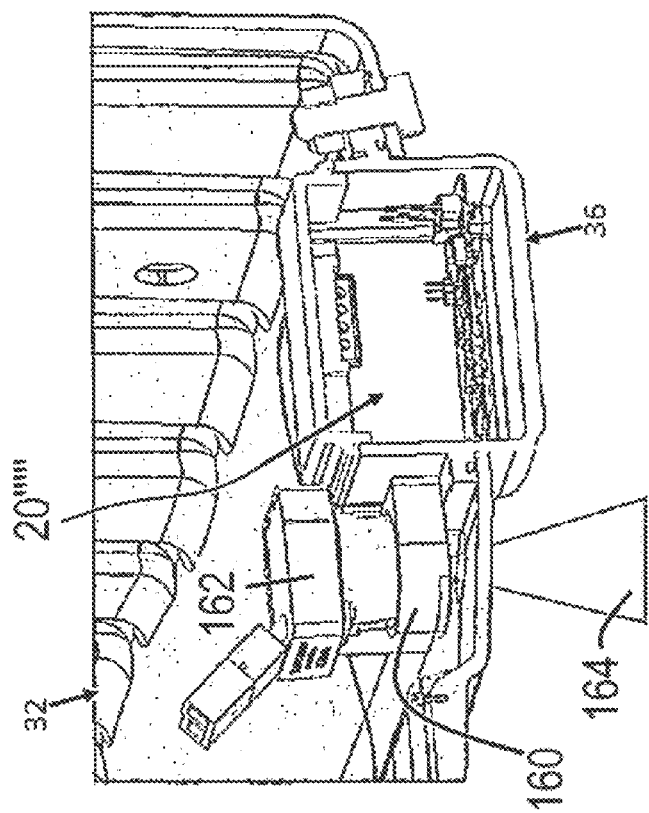
FIG. 19A is a cut-away perspective view of the sensor housing of a sixth example sensor mounted within an inside trim piece in accordance with aspects of the disclosure.

FIGS. 19A-19B shows the sensor housing 36 of a sixth example sensor 20""' mounted within the inside trim piece 32 in accordance with aspects of the disclosure and in accordance with an illustrative example. Specifically, FIG. 19A shows the sensor housing 36 extending through an aperture 154 in the inside trim 32. The sensor housing 36 may be mounted within the bumper 18 or other vehicle component. The radar sensor 20""' can, thus, obtain a direct line of sight to any objects beneath the bumper 18 without having to penetrate the inside trim 32, and/or any intervening surfaces, and/or any debris and/or dirt that may accumulate thereupon.

FIGS. 19A-19B also show the sensor housing 36 including a projector mount 160 holding an icon projector 162 that generates a projected image 164, such as an icon upon the ground or upon an object sensed by the sensor 20, 20', 20", 20'", 20"", 20""'. The icon projector 162 may, therefore, be used provide feedback to the user 24. For example, a specific icon and/or color may indicate that their motion or gesture has been successfully registered. A different icon and/or color may indicate that a motion or gesture was sensed, but that there is another issue, such as non-detection of a key fob 22 that prevents the requested action.

Figure 20:
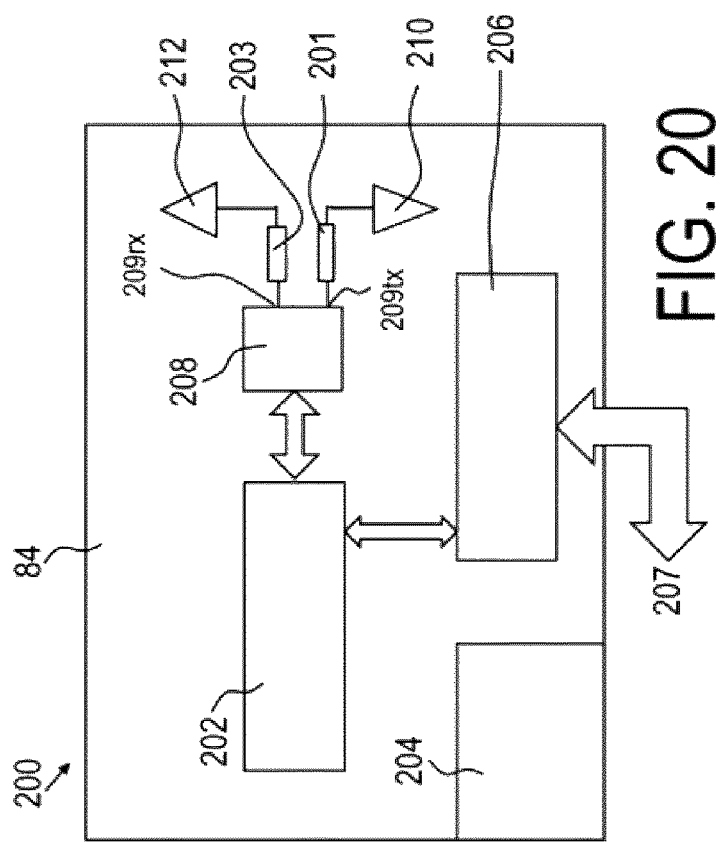
FIG. 20 is a block diagram of a sensor controller in accordance with aspects of the disclosure.

FIG. 20 is a block diagram of a sensor controller 200 in accordance with aspects of the disclosure. The example sensor controller 200 includes the printed circuit board 84 with a processor 202 disposed thereupon. The processor 202 may also be referred to as a microcontroller unit (MCU). The processor 202 may comprise, for example, one or more microprocessors, microcontrollers, a system on a chip (SoC); application specific integrated circuits (ASICs), and/or field programmable gate arrays (FPGAs). The sensor controller 200 also includes a power supply 204 for providing a regulated voltage and/or current; and a communications unit 206 for interfacing with external devices or circuitry. The communications unit 206 may be separate from or integral with the processor 202. The communications unit 206 may provide for communications via one or more networking standards such as, for example, local interconnect network (LIN), controller area network (CAN), Ethernet, or other wired or wireless protocol or standard.

Additionally or alternatively, the communications unit 206 may provide digital inputs and/or outputs (digital 10) for signaling various conditions or messages to external devices via a power and communication line 207. The sensor controller 200 also includes a radar transceiver 208 that is configured to both transmit and receive radar via a transmitting antenna 210 and a receiving antenna 212 (also referred to herein using the term "antenna") connected thereto. The controller 200 in one possible configuration is configured for operating the antenna 210, 212 for projecting/receiving the radio frequency energy having a bandwidth ranging between 23.5 GHz and 24 GHz. Other bandwidths are contemplated herein, such as the 76 to 77 GHz range. The radar transceiver 208 in one illustrative configuration is configured for transmitting only continuous wave (CW) Doppler radar signals and the sensor controller 200 is configured for determining motion using Doppler radar techniques such as extracting velocity and magnitude information based on the transmitted and received radar signals for determining a gesture, for example as disclosed in US Patent Application No. US20190162010 entitled "Radar detection system for non-contact human activation of powered closure member", the entire contents of which are incorporated by reference herein. Other sensor configurations, for example such as FMCW, time of flight, are possible.

Figure 21:
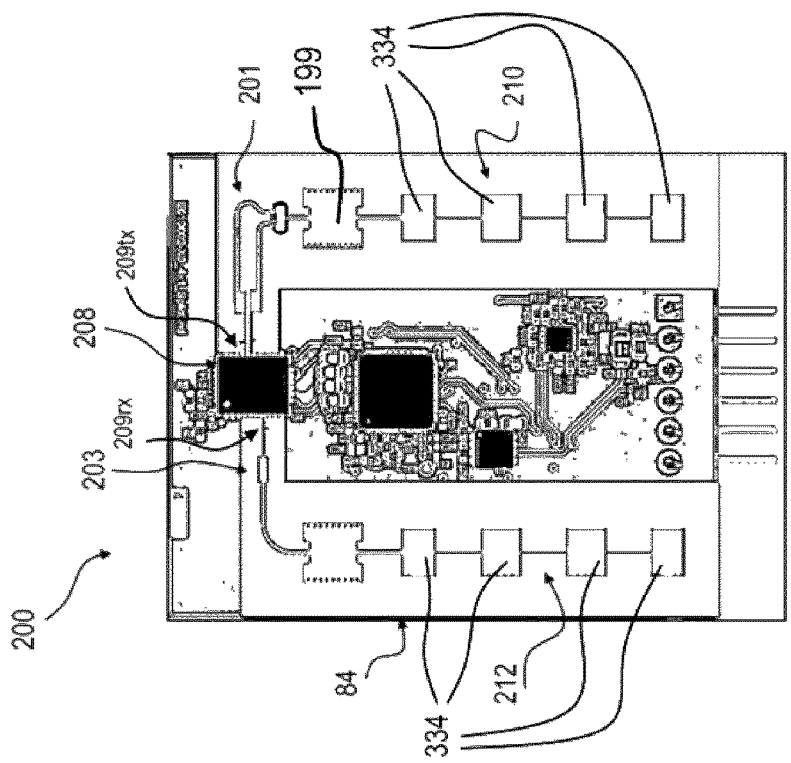
FIG. 21 is a view of the sensor controller in accordance with aspects of the disclosure.

With reference to FIGS. 20, 21 and 21A, the controller 200 is shown illustratively coupled to the antennas 210, 212 via a coupling or circuit 201, 203. Such couplings 201, 203 may be tuned couplings. Further, the controller 200 is shown to include only a single port 209*tx*, 209*rx* for each of the antennas 210, 212 coupled to each antenna coupling 201, 203. Further, the coupling 201*tx* is shown to includes a delay circuit having two transmit arms 207*a*, 207*b*, wherein one of the transmit arms 207*a*, 207*b* delays a signal produced by the controller 200 received at the single output port 209*tx* from reaching the antenna for providing a hardware based beam steering configuration, as compared to more complex and costly electronically scanned array configuration requiring a controller equipped with multiple output, multiple input (MIMO) configuration and costly controller software or programming for electronically steering the radar beam. A SIW (substrate integrated waveguide) 199 filter tuned for 500 input and output ports is shown coupled between the coupling 201*tx* and the antenna 210. The antenna circuit may be tuned, using the tuned couplings 201, 203 for example for minimizing side lobes 344*s* and back lobes 344*b* in the beam pattern, as shown in FIGS. 25A and B, which may extend beyond the footprint of the vehicle and cause false activations despite the main lobe 344*m* detection field of view residing within the footprint 142 of the vehicle. For example, the antenna tuning process may consists of creating matching networks to match impedance of controller port 209 to 500, adjusting the harmonic filter so that an attenuation is achieved at 48 GHz ($2^{nd}$ harmonic), verifying the power combiner (transmit side), length matching the two transmit arms 207*a, b* so one arm is delayed by 180° in phase due to the structure of the controller 200, and verifying the antenna is tuned properly at 24-24.25 GHz. These components may be individually tuned followed by a holistic tuning of all the components. The resulting S11 of the transmit/receive antenna are shown in FIG. 21B. The 3 dB beam width is ~20° (Phi=90°) and ~75° (Phi=0°). To have the maximum power returned at the band of interest (24 GHz to 24.25 GHz) at a power of ~3.5 dB calculated from the IQ (in-phase and quadrature signals) signal returned. Antenna tunings completed with the antenna tuned and matched at the desired band of 24 GHz to 24.25 GHz.

FIG. 21 is a perspective view of the sensor controller 200 in accordance with aspects of the disclosure. In some embodiments, and as shown in FIG. 21, the sensor controller 200 is formed on one printed circuit board (PCB) 84, however, the sensor controller 200 may include two or more printed circuit boards 84 or other devices or controllers. For example, some functions of the sensor controller 200 may be distributed amongst two or more different processors or controllers. The PCB 84 of FIG. 21 includes the processor 202, radar transceiver 208, as well as the transmitting antenna 210 and receiving antenna 212.

Figure 22:
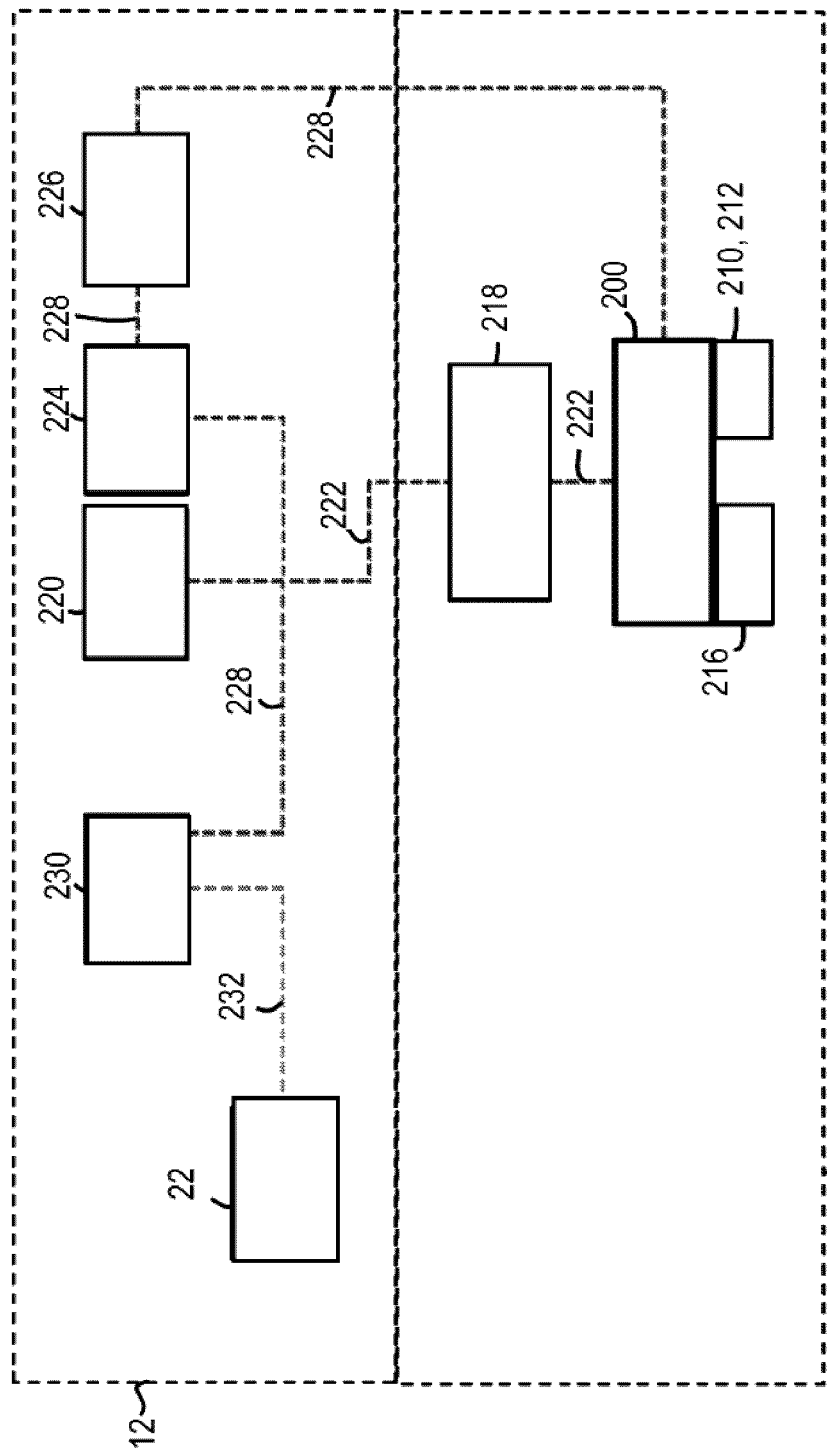
FIG. 22 is a schematic block diagram showing functional connections between components within a radar gesture system and other devices in the motor vehicle in accordance with aspects of the disclosure.

FIG. 22 is a schematic block diagram showing functional connections between components within the non-contact object and/or gesture detection system 10, which may also be called a "radar gesture system" or simply system 10, for short, and other devices in the motor vehicle 12 in accordance with aspects of the disclosure. Specifically, FIG. 22 shows the non-contact object and/or gesture detection system 10 including the sensor controller 200 functionally connected to the transmitting antenna 210 and the receiving antenna 212, and an enunciator device 216 to provide a user 24 with feedback regarding status and/or operation of the system 10. The enunciator device 216 may include one or more audio devices, such as speakers, buzzers, chimes, and/or visual devices such as a light emitting diode (LED), a display screen, warning light, and/or the icon projector 162 discussed above with reference to FIGS. 19A-19B. The system 10 also includes a system master switch 218 that may include a circuit breaker or fuse, or the like for controlling the supply of electrical power from a power bus 220 of the vehicle 12 via one or more power conductors 222.

As also shown in FIG. 22, the sensor controller 200 may be communicatively coupled to a power liftgate (PLG) system 224 via one or more wired communications lines 228 which may include digital, or analog signals. In some embodiments, and as shown in FIG. 22, the sensor controller 200 may be communicatively coupled to the power liftgate system 224 via a PLG switch 226 that combines signals from other sources such as manually operated switches to control operation or movement of the liftgate 14. As also shown in FIG. 22, the PLG system 224 is also communicatively coupled to a passive keyless entry (PKE) controller 230 via one or more wired communications lines 228. The PKE controller 230 is responsive to detection of the key fob 22 via a wireless communication link 232.

In one example application, the gesture system 10 may detect a gesture of the user 24 requesting for the liftgate 14 to be opened. The PLG system 224 may actuate the liftgate 14 to open in response, but only if the liftgate 14 is in an unlocked condition or if the PKE controller 230 verifies presence of the key fob 22 in a predetermined area, such as near the liftgate 14.

Figure 23:
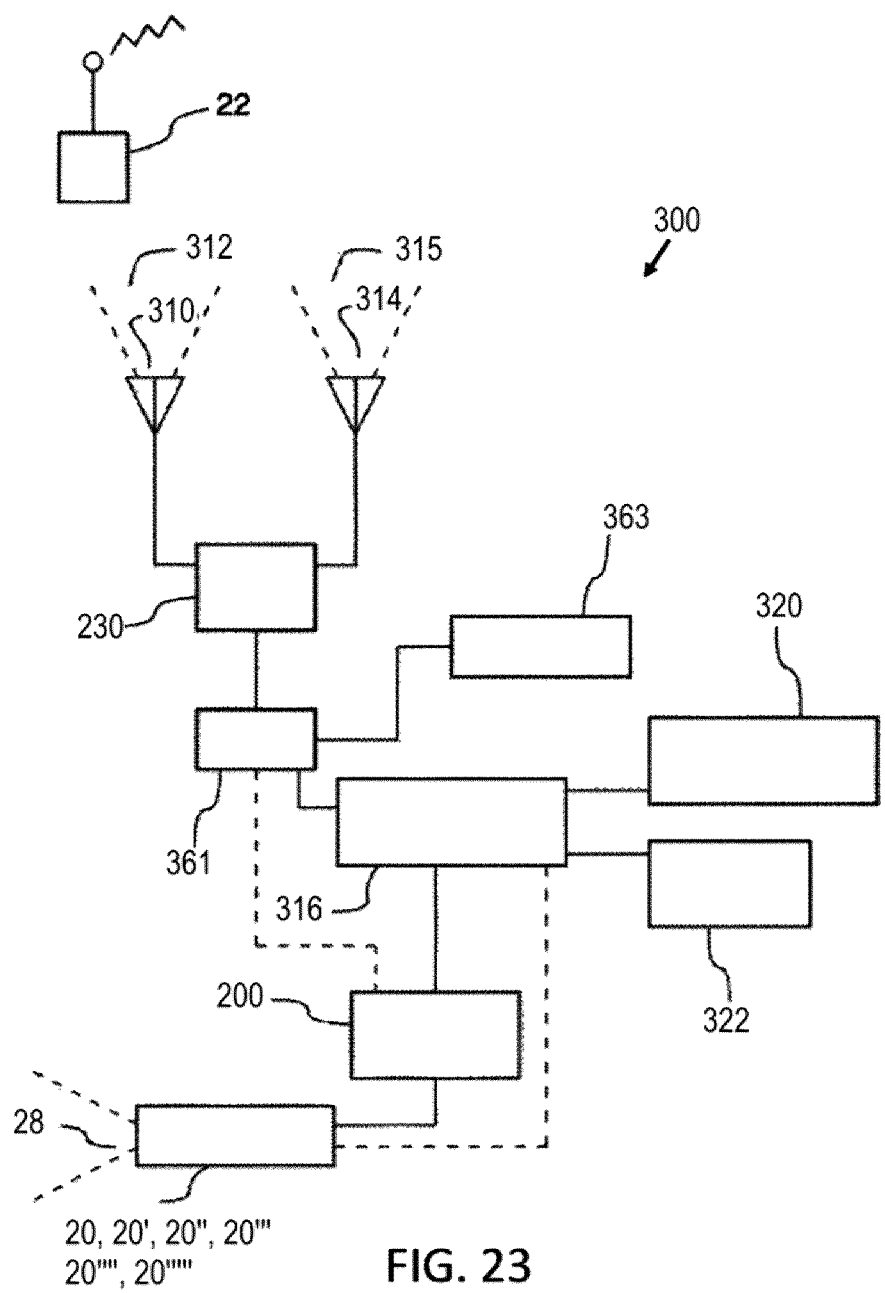
FIG. 23 is a schematic block diagram illustrating major components within a hands-free operation system for a closure of the motor vehicle in accordance with aspects of the disclosure.

FIG. 23 is a schematic block diagram illustrating major components within a hands-free operation system 300 for a closure of a motor vehicle 12 in accordance with aspects of the disclosure. Specifically, the hands-free operation system 300 includes the passive keyless entry (PKE) controller 230, which may be a combined passive entry/passive start (PEPS) and remote keyless entry (RKE) system 230, in communication with front a front antenna 310 and a rear antenna 314, and which is coupled to a general or body control module ("BCM") 361. Each antenna 310, 314 may have an associated authentication range 312, 315 within which a fob 22 may be authenticated. The BCM 361 is coupled to a liftgate controller 316 which controls a drive mechanism 320 and a latch 322 of the liftgate 14. The sensor electronic control unit ("ECU") or sensor controller 200 monitors the one or more sensors 20, 20', 20", 20''', 20'''', 20''''' and is in communication with the liftgate controller 316.

In operation, the sensor 20, 20', 20", 20''', 20'''', 20''''' detects a predetermined object or a predetermined gesture within its associated field of view 28. If the PKE controller 230 verifies that the fob 22 is within the associated authentication ranges 312, 315, the liftgate controller 316 then causes the liftgate 14 to be unlocked and/or actuated to open and/or to close by activating the drive mechanism 320 and/or the latch 322.

FIG. 24A-24B shows the sensor controller 200 in accordance with aspects of the disclosure. Specifically, the example sensor controller 200 includes the printed circuit board 84 with the processor 202, the radar transceiver 208, the transmitting antenna 210, and receiving antenna 212. In more detail, the transmitting antenna 210 is configured to transmit RF radiation and the receiving antenna 212 is configured to receive RF radiation.

Referring back to FIG. 21, there is shown a bottom view of the printed circuit board 84 including the transmitting antenna 210 and the receiving antenna 212 in accordance with aspects of the disclosure. In some embodiments, the transmitting antenna 210 and the receiving antenna 212 each have a same or similar configuration and/or construction. Alternatively, the transmitting antenna 210 and the receiving antenna 212 may be different in configuration from one another. In some embodiments, such as the example shown in FIG. 21, each of the antennas 210, 212 includes a plurality of antenna elements 334, which may also be called "patches", formed as conductive regions on the printed circuit board 84. The antenna elements 334 are formed from rectangular conductive regions in a generally flat plane, such as one or more layers of the printed circuit board 84. In some embodiments, the antenna elements 334 are arranged in a straight line as a linear array. Specifically, FIG. 21 shows an example embodiment in which each of the antennas 210, 212 includes four flat and rectangular antenna elements 334 which are arranged in a 4×1 pattern e.g. a single row (1) of four (4) antenna elements, with the antenna elements 334 of the transmitting antenna 210 being aligned in a first straight line, and the antenna elements 334 of the receiving antenna 212 are arranged in a second straight line spaced apart and parallel to the first straight line. Such arrangements of the antenna elements 210, 212 are examples of the design of the antenna, for example, the physical layout design of the antenna which can control the field of view. For example, the 4×1 antenna design of the antenna may provide a shaped radar beam having an elliptical pattern that provides wider cross-car (CC) signal detections and less Fore/Aft (F/A) signal detections. Other antenna designs such as a 5×1 antenna design may be provided depending on the width of the desired radar radiation pattern.

FIG. 25A is a perspective view of the printed circuit board 84 of FIG. 21 with a graphic representation of a radiation pattern 340 generated therefrom. FIG. 25B is a graphic view of the radiation pattern 340 generated by the transmitting antenna 210 of FIG. 21, showing intensity relative to position in 3-dimensional space. The radiation pattern 340 includes a main lobe 342 having the highest intensity and several secondary lobes 344 having lower intensity than the main lobe 342. The configuration such as size, shape, and orientation, of the main lobe 342 is a factor in determining the field of view 28 of the sensor 20, 20', 20", 20''', 20'''', 20'''''. Specifically, the 4×1 antenna configuration contributes to the relatively wide and narrow main lobe 342 shown, which may be particularly effective for the present non-contact object and/or gesture detection system 10, as discussed above with reference to FIGS. 14-17. The 4×1 antenna configuration produces a FOV 28 of 29 degrees by 80 degrees. The widest dimension of the main lobe 342 extends along a major axis $A_m$ that is perpendicular to the line of the antenna elements 334 within the transmitting antenna 210. The width $w_2$ of the FOV 28 may extend along the same major axis $A_m$ (e.g., can be the same width as $w_1$ in FIG. 16). In other words, the FOV 28 may be configured to extend along a length of the bumper 18 of the vehicle 12.

FIG. 25C is a schematic top view of the transmitting antenna 210 of FIG. 21, showing details of the antenna elements 334, each having an identical size and shape and spaced apart from one another by regular intervals, with relatively thin conductive traces 336 between adjacent ones of the antenna elements 334. In some embodiments, the transmitting antenna 210 and/or the receiving antenna 212 may be disposed at an oblique angle within the housing 36 (e.g., relative to one or more planar surfaces pf the housing 36) to control the position and/or direction of the FOV 28. FIG. 28 shows one possible example of the generated radar beam field of view having a narrow beam width in a direction (e.g. running perpendicular to major axis $A_m$ and perpendicular to the side of the vehicle 12 as a bumper 18), and a wide beam width in a transverse direction (e.g. running parallel to major axis $A_m$ and parallel to the side of the vehicle 12 as a bumper 18).

FIG. 26A is a schematic top view of a transmitting antenna 210 in the form of a steered patch antenna 350 in accordance with aspects of the disclosure, and FIG. 26B is a graphic view of the radiation pattern generated by the steered patch antenna 350 of FIG. 26A. The steered patch antenna 350 is similar in construction to the 4×1 antenna configuration shown in FIG. 25C, but with changes in the sizes of the antenna elements 334 and/or with changes in the distances between individual ones of the antenna elements 334. Specifically, the 4×1 antenna configuration illustrated in FIG. 26A steers or shifts the main lobe 342 by 20 degrees when compared with the transmitting antenna 210 of FIG. 21, while keeping a similar field of view 28 of 29 degrees by 80 degrees. In one possible configuration, the steered patch antenna 350 is a center steered antenna without a lobe, or with a minimized lobe as compared to a main lobe, extending outside of the footprint of the bumper 18. Such an extending lobe may contribute to undesired gestures outside the desired detection field of view being detected. As shown in FIGS. 25D and 25E, a 4×1 centered steered receive 212 and transmit 210 antennas have similar parameters, for example with side lobes that is −15 dB down from the main lobe (3% power of the main lobe). The 3 dB beam width is ~21° (Phi=90°) and ~74° (Phi=0°). The 10 dB beam width is ~37° (Phi=90°) and ~141° (Phi=0°). As shown in FIGS. 25F and 25G, a 5×1 (Shown in FIG. 25C having an additional patch 334 shown in phantom outline) centered steered receive and transmit antennas have similar parameters, for example with side lobes that is −13 dB down from the main lobe (5% power of the main lobe). The 3 dB beam width is ~16° (Phi=90°) and ~74° (Phi=0°). The 10 dB beam width is ~29° (Phi=90°) and ~138° (Phi=0°). Such antenna designs herein may control the field of view and provide for various displaced mountings of the sensor 20, 20', 20", 20''', 20'''', 20''''' away from an outer perimeter, e.g. such as defined by external paneling or accessories, of the footprint of the vehicle while allowing the field of view to be adjusted to compensate for such displaced mountings. For example the sensor 20, 20', 20", 20''', 20'''', 20''''' does not have to be placed or mounted to a bumper, but rather can be displaced from the bumper and may in one possible configuration be mounted to a frame or unibody 17 of the vehicle 12 (an example of a vehicle component having an external vehicle surface) inwardly (e.g. towards the center of the vehicle, behind the bumper 18 having an internal vehicle surface) and away from the exterior footprint for providing protection to the sensor 20, 20', 20", 20''', 20'''', 20''''' during minor crashes and accidents for example, as compared to sensors directly mounted to the internal surface of the bumper 18 which may be damaged when the bumper is damaged, such as that which may occur with capacitive sensors mounted directly on the inner surface of the bumper. Sensor 20, 20', 20", 20''', 20'''', 20''''' may in a possible configuration also be mounted to the vehicle accessory such as the bumper 18. Further, such antenna design may control the field of view and provide for various displaced mountings of the sensor 20, 20', 20", 20''', 20'''', 20''''' away from an outer perimeter of the foot print of the vehicle allowing for the field of view to be free of any interference in the line of sight of the sensor due to obstacles such as vehicle accessories or components 99, which may be metallic, including without limitation mufflers, exhaust pipes, trailer hitches and hitch support structures/tubing, metallic license plates, metal support brackets, bumper guards, winches, undercar stowed spare wheels, light assemblies, and so forth. Such antenna design does not require additional reflective (e.g. metallic) elements to shape the field of view.

This may be useful for packaging the sensor 20, 20', 20", 20''', 20'''', 20''''' in one area and projecting the FOV 28 to another, more desirable area. For example, this configuration may be useful to provide FOV coverage 28 in an area where there are interferences, such as a trailer hitch or other hardware, that limits placement of the sensor 20, 20', 20", 20''', 20'''', 20'''''.

In some embodiments, the receiving antenna 212 may have an associated region of high gain or ability to receive RF radiation. Such a high-gain region may be analogous to the radiation pattern 340 of the transmitting antenna. The receiving antenna 212 may be configured as a linear array, and/or as a steered patch antenna 350, similarly to the transmitting antenna 210 in order to control the FOV 28 of the sensor 20, 20', 20", 20''' 20'''', 20'''''.

FIG. 27A is a perspective view of a printed circuit board 84 including a transmitting antenna 210 and a receiving antenna 212 in accordance with aspects of the disclosure. Specifically, each of the antennas 210, 212 is configured as a 2×1 configuration, with two antenna elements 334 within each of the antennas 210, 212. FIG. 27B is a graphic view of the radiation pattern 340 generated by the transmitting antenna of FIG. 26A. As shown in FIG. 27B, the 2×1 transmitting antenna causes a roughly spherical main lobe 342 to project outwardly from a plane of the printed circuit board 84. A roughly spherical secondary lobe 344 extends from a back of the printed circuit board 84 opposite the main lobe 342.

FIG. 28 is a schematic top view of a bumper 18 of a motor vehicle showing an FOV 28 of a sensor 20, 20', 20", 20''', 20'''', 20''''' in accordance with aspects of the disclosure. Specifically, FIG. 28 shows a relatively wide and narrow main lobe 342 and its associated FOV 28 extending across a relative wide region of the bumper 18. FIG. 28 illustrates an orientation of the a sensor 20, 20', 20", 20''', 20'''', 20''''' whereby each single linear row of transmit and receive elements extend substantially along a direction perpendicular to the outer side foot print, shown in FIG. 28 as bumper 18 in one example, of the vehicle proximate to the sensor.

The outer side foot print may also include the front bumper, or the sides of the vehicle such as the rocker panels as examples. In one possible configuration, the antenna is configured to extend the field of view 28 along only a portion of the side of the footprint of the vehicle. In another possible configuration, the antenna is configured to extend the field of view 28 along an entire portion of the side of the footprint of the vehicle. Which such a configuration a user may perform a gesture at any location about the side of the vehicle without requiring to have to identify the location of the sensor 20, 20', 20", 20''', 20'''', 20''''' and perform the gesture directly below the sensor 20, 20', 20", 20''', 20'''', 20'''''. Therefore a sensor 20, 20', 20", 20''', 20'''', 20''''' having a wide activation area is provided without the requirement of a gesture or object being placed immediately under the sensor 20, 20', 20", 20''', 20'''', 20''''' for the sensor 20, 20', 20", 20''', 20'''', 20''''' to be able to detect the gesture or object.

FIG. 29A is a schematic side view of a bumper 18 of a motor vehicle 12 showing a field of view 28 of a sensor 20, 20', 20", 20''', 20'''', 20''''' having a steered antenna 350 and with a FOV 28 that extends outwardly beyond the footprint 142 of the vehicle 12. FIG. 29B is similar to FIG. 29A, but with a shifted FOV 28' that does not extend beyond the footprint 142 of the vehicle 12. In other words, FIGS. 29A and 29B illustrate the use of beam steering to shift the FOV 28 without requiring an adjustable bracket or feature.

FIG. 30 is a cut-away side view of a sensor 20, 20', 20", 20''', 20'''', 20''''' within the bumper 18 of the motor vehicle 12 in accordance with aspects of the disclosure. Specifically, FIG. 30 shows debris 354, such as dirt, dust, rocks, and/or moisture that can accumulate between the housing 36 of the sensor 20, 20', 20", 20''', 20'''', 20''''' and an inner surface 356 of the bumper 18, for example in a gap g formed between the housing 36 and the inner surface. Such debris 354 can interfere with transmission of RF radiation 26 and can, therefore, adversely affect operation of the sensor 20, 20', 20", 20''', 20'''', 20'''''. In some embodiments, the housing 36 of the sensor 20, 20', 20", 20''', 20'''', 20''''' may be mounted flush against the inner surface 356 of the bumper 18 to minimize and/or prevent space for intrusion of such debris 354. For example, the housing 36 of the sensor 20, 20', 20", 20''', 20'''', 20''''' may be mounted flush against the inner surface 356 of the bumper 18 such that there is no gap provided between the housing 36 and the inner surface. In another possible configuration as shown in FIG. 30A, a trim of bumper 18 through which the field of view 28 may be projected is not parallel to ground 9 and printed circuit board (PCB) 84 is not positioned parallel to the trim of the bumper 18, therefore creating an irregular air gap (shown as differences in gaps g1, g2 below the radar sensor housing 36) between the housing 36 of the sensor 20, 20', 20", 20''', 20''''' and the trim of the bumper 18. The radiation projected through the irregular air gap and the trim of the bumper 18 as transmitted and received by the sensor 20, 20', 20", 20''', 20'''', 20''''' having a tuned antenna is not adversely attenuated so as to affect the field of view 28. FIG. 31 shows a cut-away side view of a sensor 20, 20', 20", 20''', 20'''', 20''''' within a bumper 18, similar to FIG. 30, but with the addition of a seal 358 between the radar housing 36 and the inner surface 365 of the bumper 18. The seal 358 may be formed of resilient material, such as rubber, silicon, etc. and functions to prevent debris 354 from entering between the antennas 210, 212 and the bumper 18.

As best shown in FIG. 32, a method of operating the sensor 20, 20', 20", 20''', 20'''', 20''''' (e.g., radar) for the motor vehicle 12 to sense at least one of a gesture and an object next to the motor vehicle 12 is also provided. The method includes the step of 400 mounting a radar housing 36 on the motor vehicle 12. The radar housing 36 has an antenna 210, 212 disposed within the radar housing 36. The method continues with the step of 402 configuring the antenna 210, 212 to project radio frequency energy 26 through a field of view 28 to detect the object (e.g., foot 150) or the gesture within a footprint 142 of the motor vehicle 12. The antenna 210, 212 is configured to prevent the field of view 28 from extending outside of the footprint 142 of the motor vehicle 12.

The method can also include the step of steering the radio frequency energy 26 downwardly and away from the motor vehicle 12 towards a ground surface beneath the motor vehicle 12 using the antenna 210, 212. In addition, the method can further include the step of generating a projected image 164 upon the ground surface or upon the object detected by the antenna 210, 212 using an icon projector 162 coupled to the radar housing 36. The method can also include the step of holding and positioning the radar housing 36 for controlling the field of view 28 using a bracket 38 coupled to the radar housing 36. Additionally, the method can include the step of mounting the radar housing 36 flush against an inner surface 356 of the motor vehicle 12 to minimize intrusion of debris 354.

As discussed above, the sensor 20, 20', 20", 20'", 20"", 20'"" positioning can be adjusted or beam steering may be employed to shift the FOV 28, for example. In addition, referring initially to FIGS. 33A and 33B, a radar housing 500 of the sensor 20, 20', 20", 20'", 20"", 20'"" for the motor vehicle 12 can include a first exemplary radar absorber 502 of radar absorbing material for beam forming in addition to or in lieu of the positioning adjustment or beam steering using the antenna 210, 212. Specifically, the housing 500 can, for example, be formed of a polymer (e.g., polycarbonate (PC) and/or acrylonitrile butadiene styrene (ABS)) and the radar absorber 502 can be formed of silicon carbide-filed polymer or rubber, which absorbs radiofrequency energy exiting or returning to the sensor 20, 20', 20", 20'", 20"", 20'"". The absorber 500 is disposed outside housing 500; however, may be considered part of the housing 500. An approximate radar field of view 28 is shown with a reflective surface 504 and relative to the printed circuit board (PCB) 47, 84 are also shown in FIG. 33A. FIG. 33B shows an example aperture 506 in the absorbing panel 502 configured to allow radar emitted from the transmitting antenna 210 and received by the receiving antenna 212 after reflection from the reflective surface 504 therethrough. Similarly, FIGS. 34A-34B show a second exemplary radar absorber 502' relative to the antennas 210, 212 and disposed inside housing 500. With both radar absorbers 502, 502', the radar beam detection zone or field of view 28 can be controlled 28 (e.g., approximately 30 degrees) to immediately or directly below the location of the sensor 20, 20', 20", 20'", 20"", 20'"", for example. Such radar absorbers 502, 502' can reduce inadvertent activations caused by incorrect foot 42, 150 placement (for example, outside the footprint 142 of the motor vehicle 12). In other words, without the techniques described herein, the field of view 28 of the sensor 20, 20', 20", 20'", 20"", 20'"" could be unnecessarily large (e.g., approximately 160 degrees and false activations could occur when the foot 42, 150 is located rearward of the vehicle 12, for example.

Figure 36B:
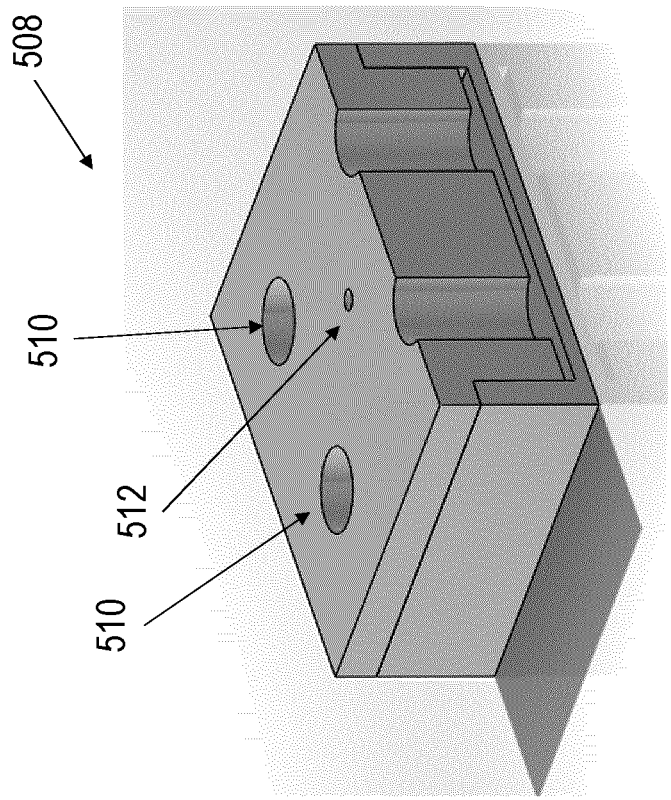
Figure 36A:
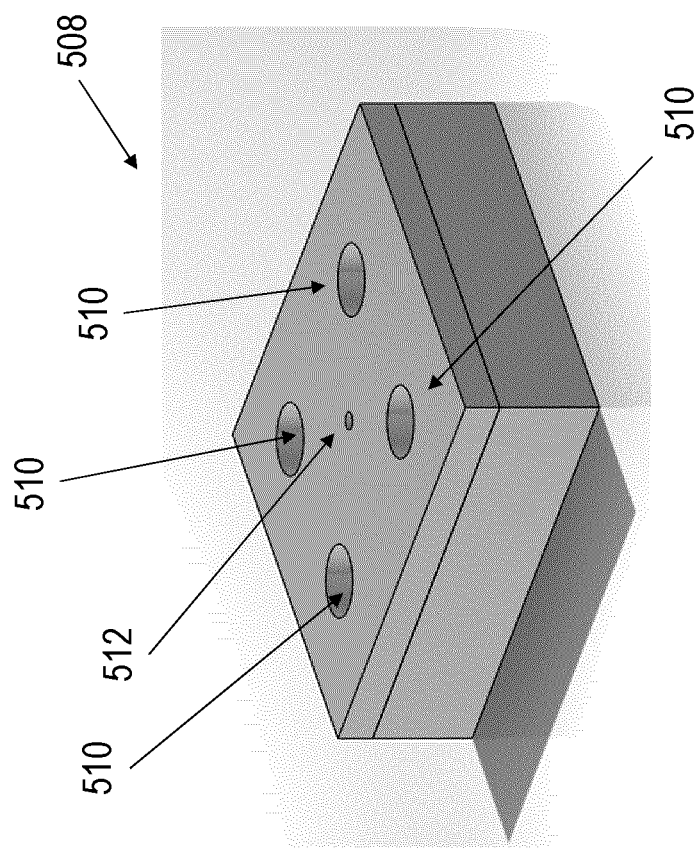
Figure 36D:
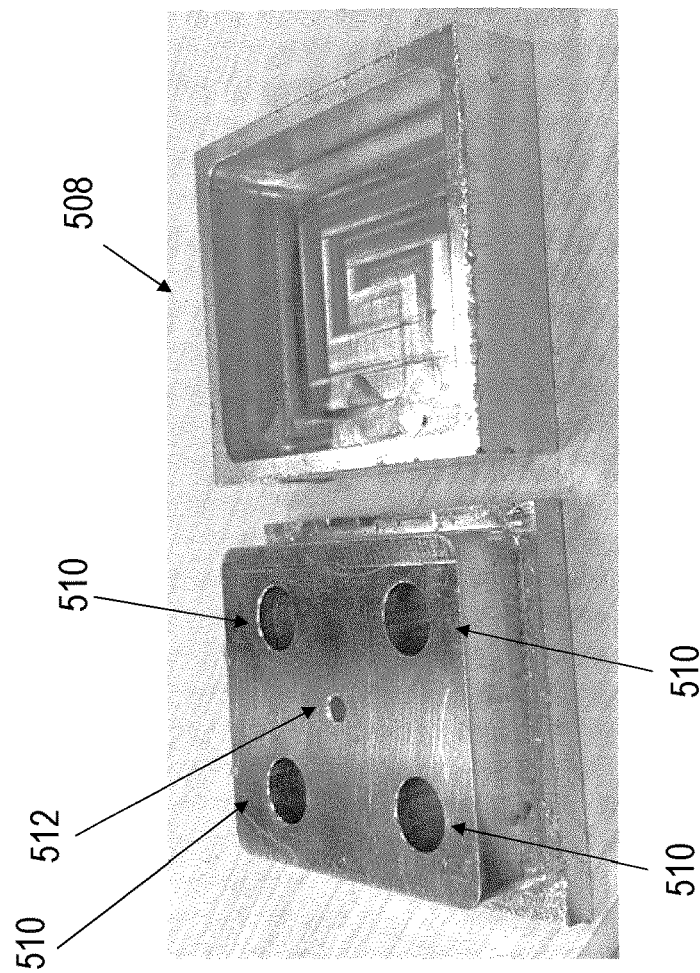
Figure 36C:
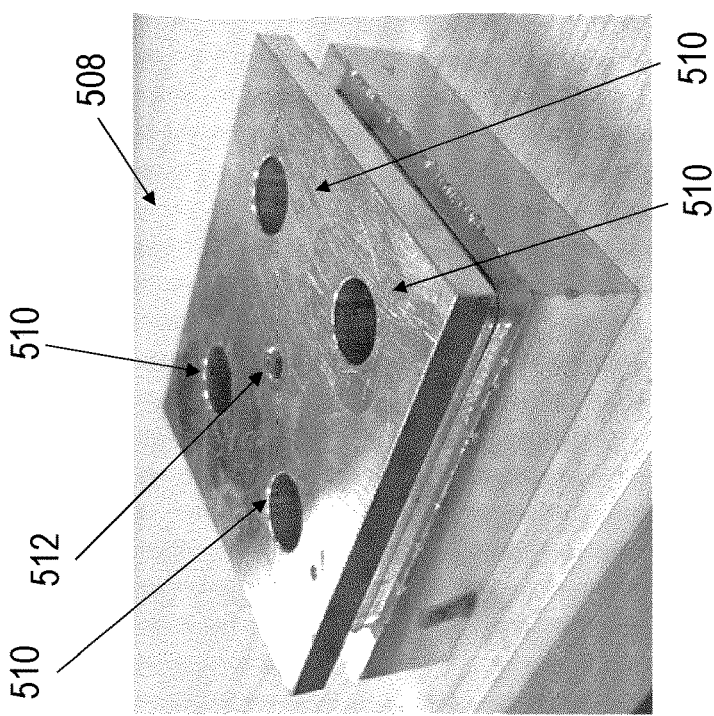

FIG. 35 is a table showing a testing plan of the radar absorbers 502, 502'. FIG. 6 illustrates a mold 508 used in the testing plan with four holes 510 for injecting the mixture to form the radar absorbers 502, 502' (FIGS. 36A-36B show the mold 508 as drawn in a computer aided design application and FIGS. 36C and 36D show the mold as formed in aluminum) and one central hole 512 in the middle for air escape.

Experimentation was done as follows. First, a grain size for 24 GHz step sensor frequency was determined. Next, grain sizes for different frequencies (77 GHz) was researched. Specifically, 8, 18, 35, 70 microns were tested and 70 performed the best. Then, material thickness was determined through trials—the aluminum mold 508 was designed so that the radar absorbing material could be molded at different thicknesses. Thus, target thicknesses were researched (material thickness related to wavelength). An optimal distance from the antenna 210, 212 to the absorber 502, 502' (absorptive material) was determined and matched to a height of the bumper 18 from the ground. A polymer/rubber matrix, PlatSil 73-60 Silicone Rubber, was chosen.

Electrical specific resistance is important for absorbability of radar and a target for specific resistance is ideally 0.01 to 100 ohm-centimeter. Silicon carbide (SiC) is a strong absorber of microwave energy (300 MHz to 300 GHz) and is recyclable, non-corroding, and non-toxic. As a perfect non-invasive alternative, SiC can be an ideal material for enhancing heating rates of non-polar reaction mixtures. It strongly absorbs microwave energy and subsequently and rapidly transfers the generated thermal energy via conduction phenomena to the reaction mixture. This allows microwave-transparent or poorly absorbing reaction mixtures to be effectively heated to extremely high temperatures and pressures. Furthermore, due to its high melting point (approx. 2700° C.) and very low thermal expansion coefficient it can be employed up to extremely high temperatures. Additionally, due to the fast heat distribution within the material, hot spots can be excluded and homogeneous temperature distribution and uniform heating within the whole material are guaranteed. Practically, SiC is a virtually indestructible and fully recyclable solid material, and different shapes of microwave reactor accessories are provided, which can be employed in both single-mode and multimode microwave reactors.

For instance, an absorbing medium is prepared using nanosize carbon black (CB) blended with nanosize silicon carbide (SiC). The medium improves the wave absorption properties and the wave band of the single CB absorbent. The microstructure, conductivity, dielectric property, and microwave absorption of the material can be studied by means of field emission scanning electron microscopy, trielectrode method, and vector network analyzer respectively. The results show that SiC can reduce the percolation threshold of CB/epoxide resin composite. Addition of certain mass of SiC can improve the microwave absorption of the composite. When 5 weight % carbon black is blended with 50 eight % SiC to fabricate a composite with a 2 mm thickness, for example, the maximum reflection loss becomes −41 decibels (dB) at 9 gigahertz (GHz), and the −10 dB bandwidth reaches 6 GHz. Thus, such a prepared composite has the potential for use in electromagnetic absorption.

Using silicon carbide grains, the optimum thickness, grain size and composition, the highest RADAR attenuation was determined through the experimentation discussed herein. A silicon carbide-filled rubber part or absorber can attenuate the RADAR signal at 10-20 dB. The optimum silicon carbide particle size, mixing ratio with the rubber, and the part thickness (e.g., of the absorber 502, 502') to achieve the attenuation goal is also determined. An example thickness Th of 3.15 millimeters (mm) is shown in FIG. 37. As disclosed, the distance between the radar antenna 210, 212 and the absorbing material (i.e., absorber 502, 502') for sufficient attenuation and beam control along with the aperture shape and size for the correct beam control were also determined herein. Note that any radar absorbing material could be used as long as the minimum attenuation is achieved. Other radar absorbing materials include carbon nanotubes, carbon black.

FIGS. 38A-38C illustrate options for apertures 506 of the radar absorbers 502, 502' according to aspects of the disclosure. FIG. 39 shows limitations of usage that are evaluated according to aspects of the disclosure. In more detail, Silicon polymer layers were manufactured with the listed silicon carbide particle sizes, concentrations, and 3 layer thicknesses measuring ¼ wavelength±10% and tested. The signal attenuation of various SiC screens in front of 24 GHz radar was measured to determine which combination of materials produces maximum signal attenuation with the radar fully blocked by the absorber 502, 502' including the SiC.

Figures 40A, 40B, 40C:
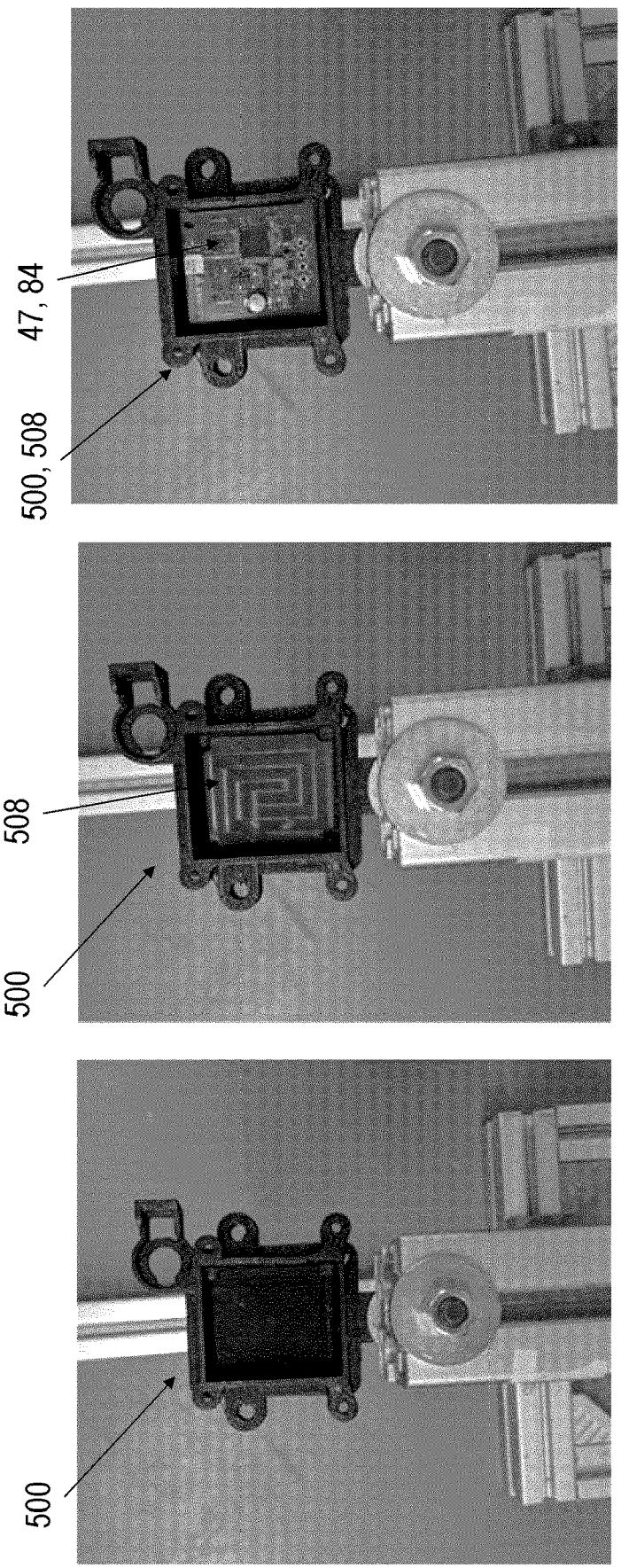
Figure 40D:
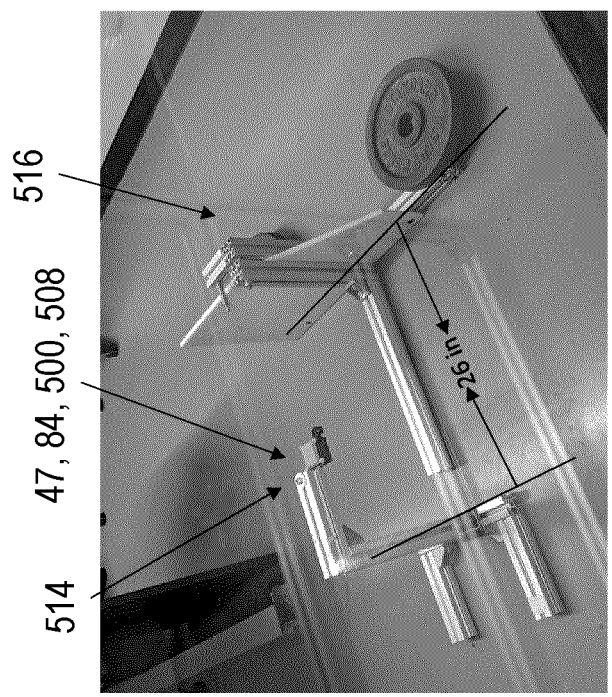

FIGS. 40A-40D show an arrangement of a housing 500 (FIG. 40A), mold 508 (FIG. 40A), and radar PCB 47, 84 in the housing 500 according to aspects of the disclosure. In FIG. 40D, the radar casing or jig 514 is shown simulating a height from rear bumper 18 and 26 inches from a barrier 516 nearby. A space for the silicon polymer shield (absorber 502, 502') is provided and holds the sensor 20, 20', 20'', 20''', 20'''' with a consistent spacing.

Figure 41B:
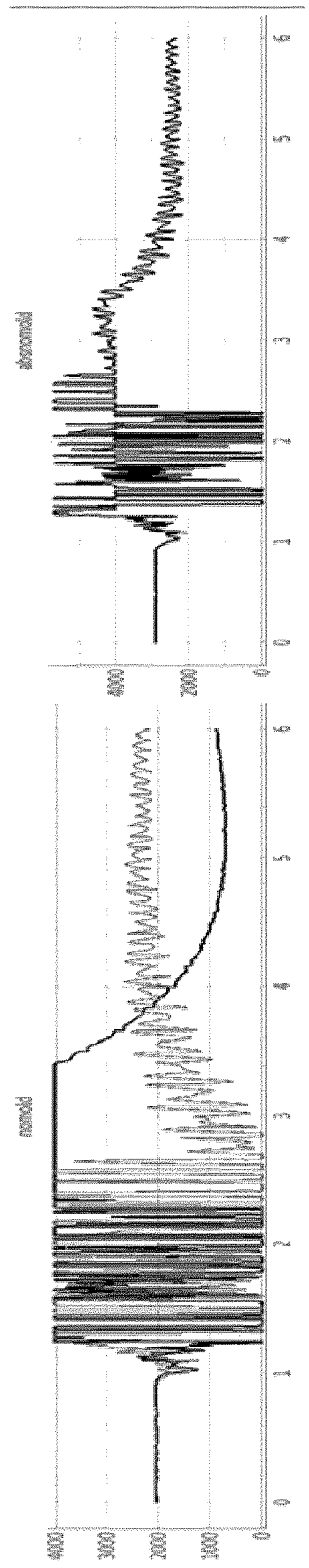

FIGS. 41A-41B, 42A-42E, 43, 44, 45, and 46A-46B show evaluation results according to aspects of the disclosure. More specifically, as shown in FIG. 41A, 30 trials of swings were captured to gain a more accurate understanding of material signal attenuation as a large variance was observed through testing. All absolute values of in-phase (I) and quadrature (Q) signals were added together while the radar signal or transmission was active to determine an absolute signal value. FIG. 41B shows an example plot of the I and Q signals showing the attenuation.

Figures 42A, 42B, 42C, 42D, 42E:
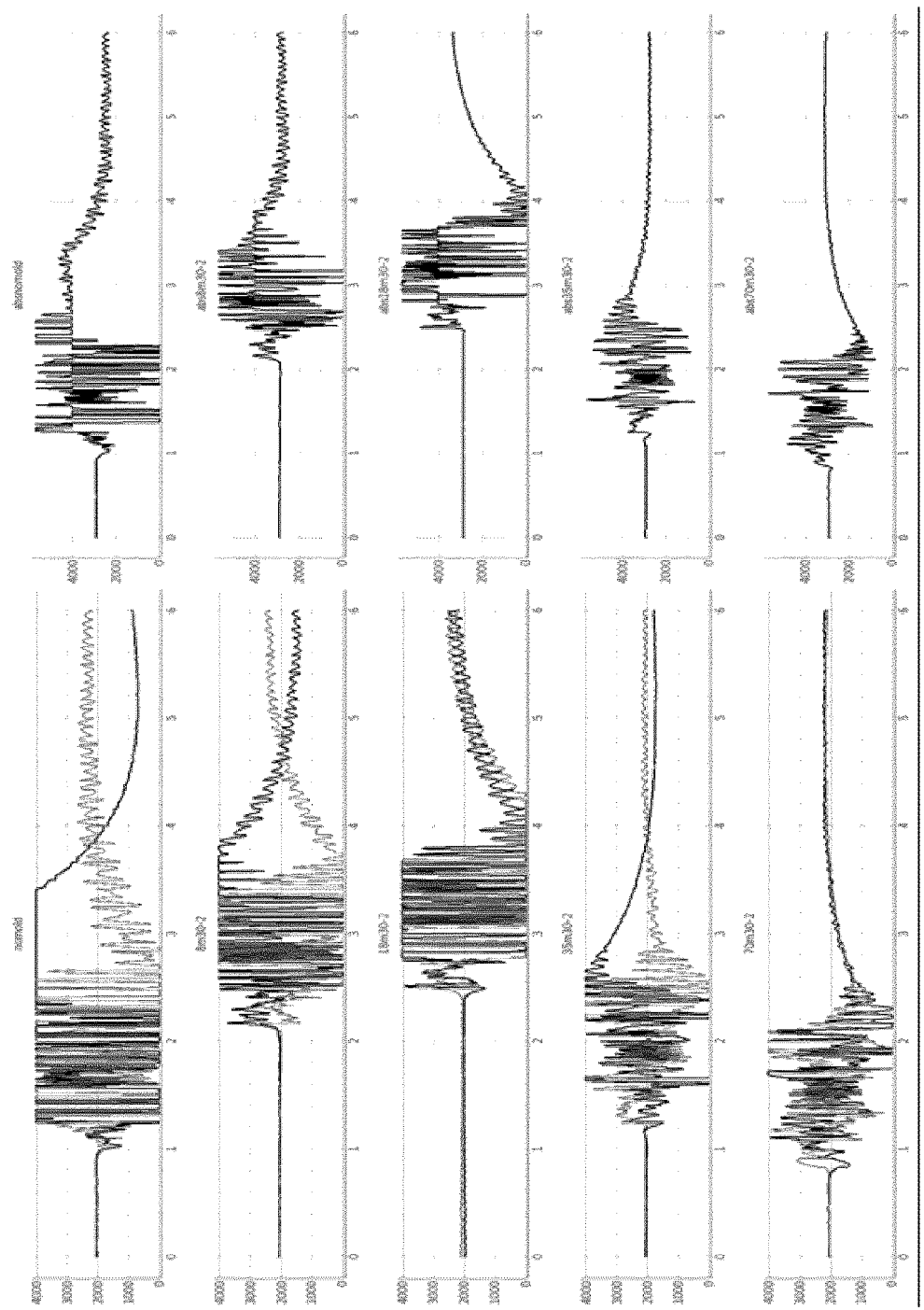

FIG. 42A shows the I and Q signals with no material (i.e., no SiC absorber 502, 502'). FIG. 42B shows the I and Q signals with an absorber 502, 502' with 8 micron SiC grains, 30% concentration and a 3.5 mm thickness Th. FIG. 42C shows the I and Q signals with an absorber 502, 502' with 18 micron SiC grains, 30% concentration and a 3.5 mm thickness Th. FIG. 42D shows the I and Q signals with an absorber 502, 502' with 35 micron SiC grains, 30% concentration and a 3.5 mm thickness Th. FIG. 42E shows the I and Q signals with an absorber 502, 502' with 70 micron SiC grains, 26% concentration and a 3.5 mm thickness Th.

Figure 43:
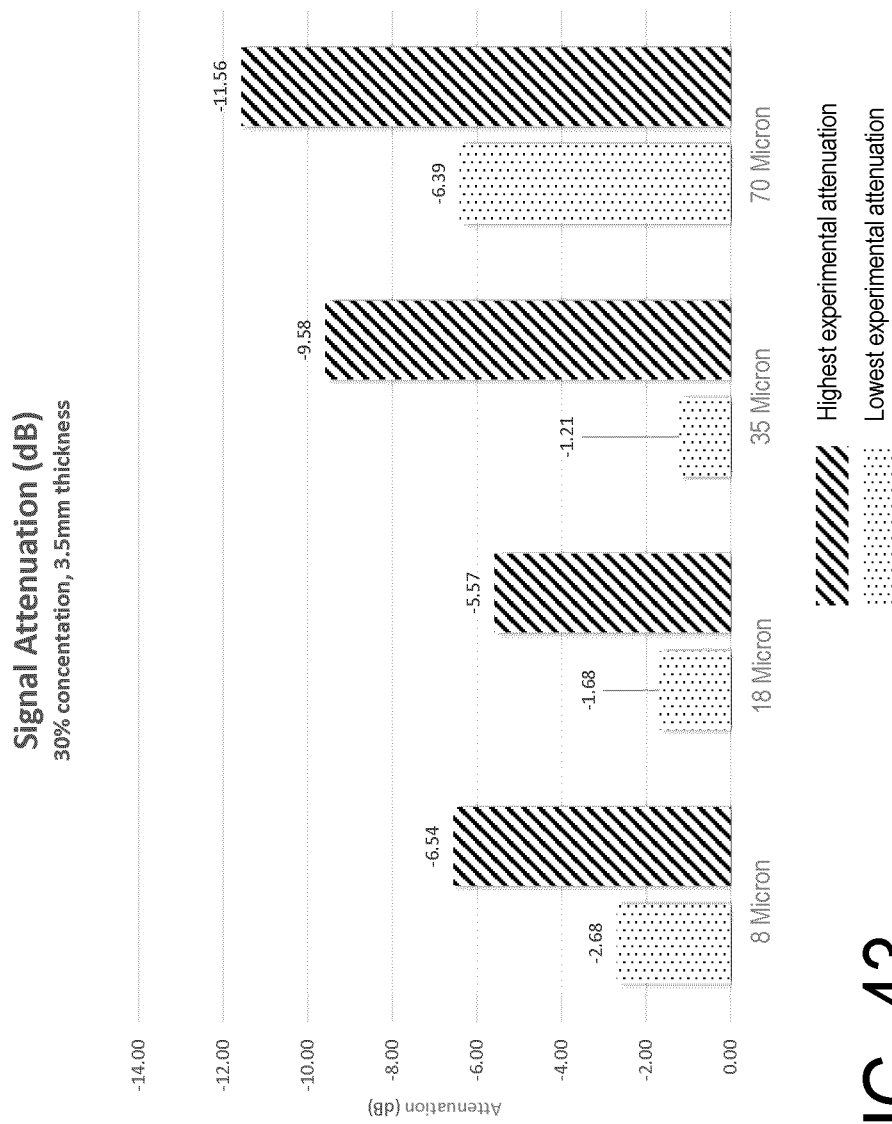
Figure 44:
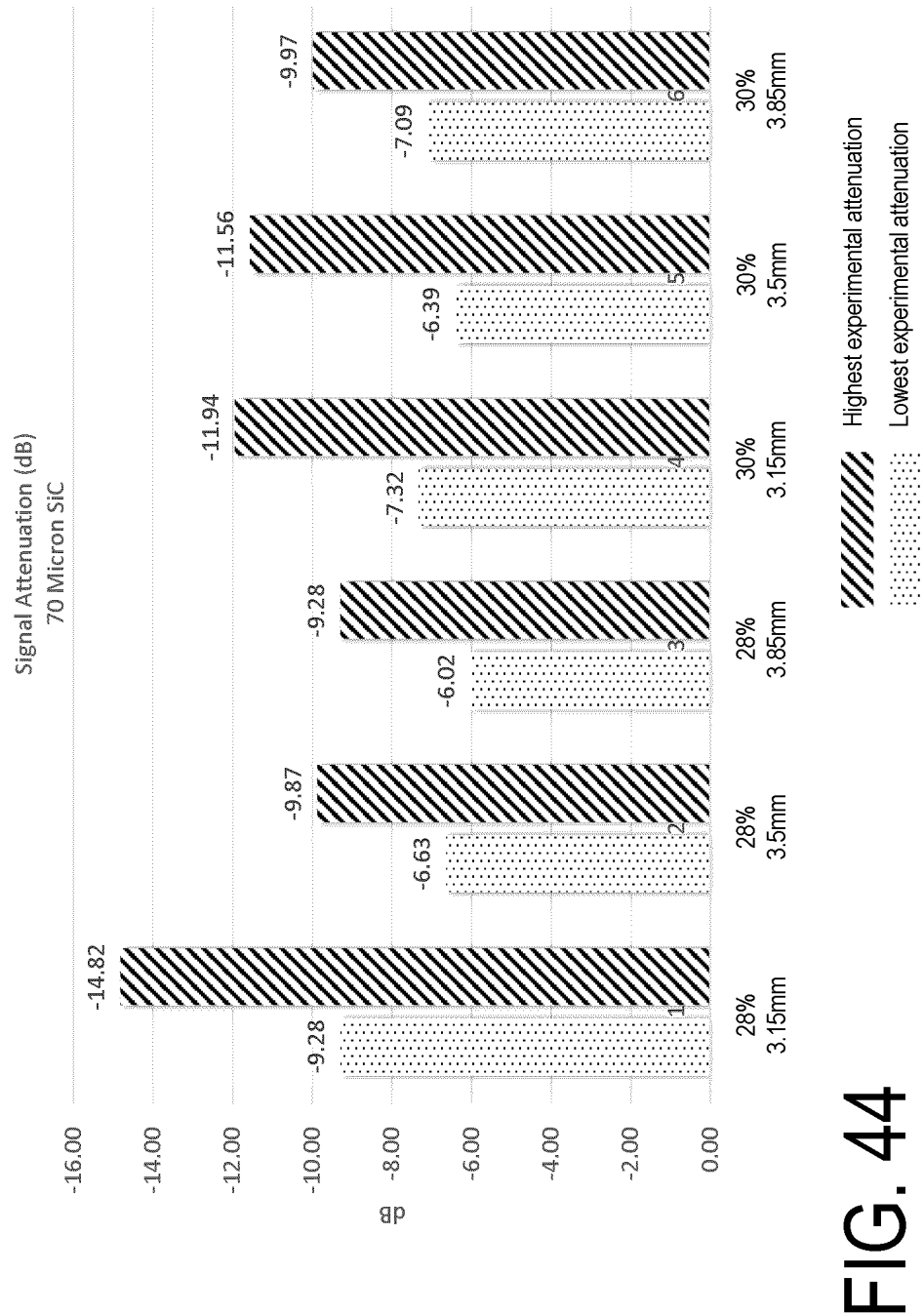
Figure 46A:
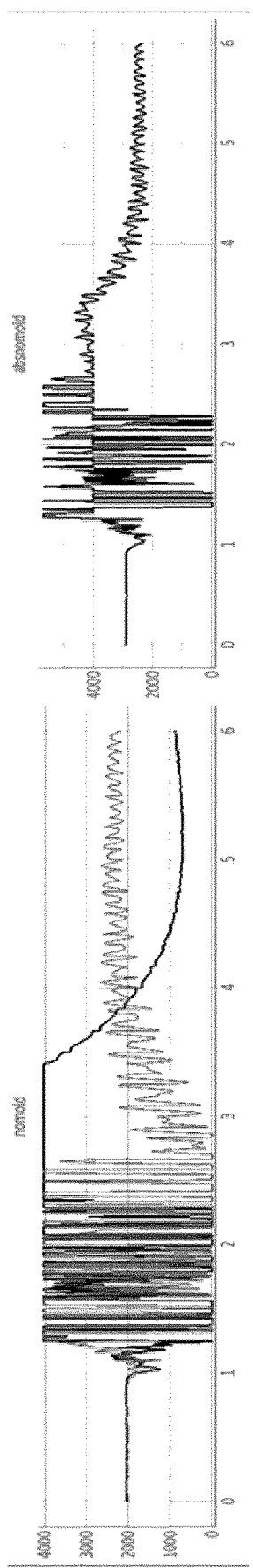
Figure 46B:
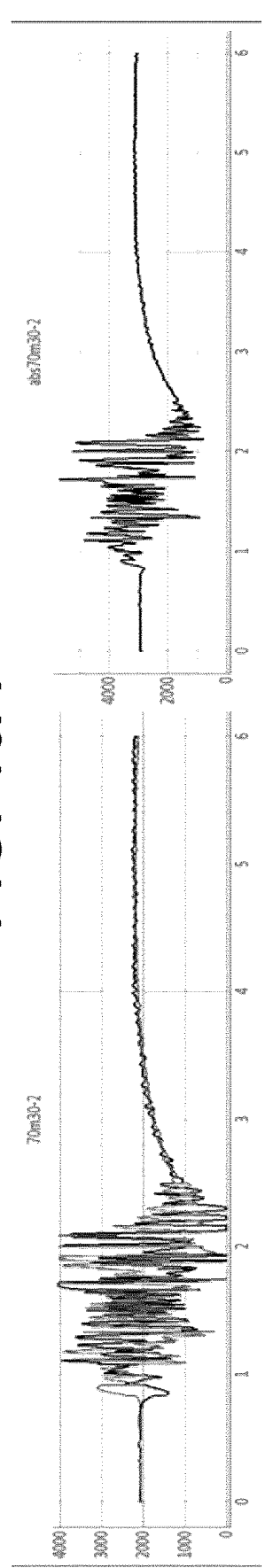

Radar signal attenuation are shown in FIGS. 43 and 44. For FIG. 43, testing was repeated for 30% concentration, 3.5 mm thickness for all SiC micron sizes to verify effects of micron size on attenuation. Increasing micron size provided greater signal attenuation with −11.56 dB≈73.59% attenuation−6.49 dBz≈52.10% attenuation. For FIG. 44, 30 test samples were obtained for additional thicknesses Th of the absorber 502, 502' and SiC concentrations were tested to verify effects of thickness Th of the absorber 502, 502' and SiC concentration. Ranges of signal attenuation was fairly consistent over all polymers tested. Minimums and maximums of 70 Micron signal attenuation were found to be −14.82 dB≈81.84% Attenuation−6.02 dB≈52.01% Attenuation. Results of the testing concluded that a 70 micron silicon carbide-filled rubber at 28% SiC content, a 3.15 mm thickness Th can provide −9.2 to −14.8 signal attenuation as shown in FIG. 45. So, as shown in FIGS. 46A and 46B, the largest tested particle or grain size (70 microns) causes the most attenuation to the 24 GHz radar waves. High volume testing validates that 70 micron SiC attenuates between 50% and 80% of signal compared to uncovered data samples. The uncovered data samples are shown in FIG. 46A and test data of 70 Micron SiC shield or absorber 502, 502', 30% concentration, 3.5 mm thickness absorbers 502, 502' is shown in FIG. 46B.

Advantages of such absorbers 502, 502' include a limiting the radar detection area or field of view 28 to a specifically defined zone. A sufficient attenuation to be able to limit the radar field of view is achieved as discussed above.

The foregoing description of the several embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example detection system can likewise be implemented into many other systems to control one or more operations and/or functions.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. A sensor for a motor vehicle, comprising:
   a radar housing; and
   an antenna disposed within the radar housing and configured to project radio frequency energy through a field of view of the sensor to detect an object or a gesture within the field of view of the sensor;
   wherein at least one of the radar housing and the antenna is configured to control the field of view of the sensor; and
   wherein the antenna is configured to shape the field of view to within a footprint of the motor vehicle such that the field of view does not extend outside of the footprint of the motor vehicle, and wherein the footprint represents the area defined by an outer extent of the motor vehicle projected down on the ground below the motor vehicle.

2. The sensor of claim 1, wherein the field of view is controlled by a design of the antenna.

3. The sensor of claim 1, wherein the projected radio frequency energy is projected as a beam having a pattern that extends in a direction parallel to a side of the motor vehicle.

4. The sensor of claim 1, wherein the antenna comprises an array of antenna elements arranged as a linear array to provide a beam comprising a narrow beam width in a direction and a wide beam width in a transverse direction that is transverse to the direction of the narrow beam width.

5. The sensor of claim 4, wherein the array of antenna elements comprises a single linear row of transmit elements and a single linear row of receive antenna elements.

6. The sensor of claim 5, wherein each single linear row of transmit and receive elements define a 4×1 pattern or a 5×1 pattern.

7. The sensor of claim 6, wherein each single linear row of transmit and receive elements extends along a direction perpendicular to a bumper of the motor vehicle.

8. The sensor of claim 1, wherein the antenna is configured as a steered antenna for directing the field of view towards the ground within the footprint of the motor vehicle.

9. The sensor of claim 8, wherein the steered antenna is configured as a center steered antenna.

10. The sensor of claim 1, wherein the antenna is configured to extend the field of view along an entire side of the footprint of the motor vehicle.

11. The sensor of claim 1, wherein the radar housing is mounted behind an external surface of the motor vehicle and displaced from an inner surface of the motor vehicle.

12. The sensor of claim 1, further comprising a controller configured for operating the antenna for projecting the radio frequency energy having a bandwidth ranging between 23.5 GHz and 24 GHz.

13. The sensor of claim 1, further comprising a controller for operating the antenna for projecting the radio frequency energy, wherein the controller comprises a single output port coupled to the antenna by two transmit arms, and wherein one of the transmit arms delays a signal produced by the controller at the single output port before reaching the antenna.

14. The sensor of claim 1, further comprising a controller coupled to the antenna configured for operating the antenna for projecting the radio frequency energy and further comprising a tuned coupling interconnecting the antenna and the controller.

15. The sensor of claim 14, wherein the tuned coupling is tuned and matched within a frequency band of 24 GHz to 24.25 GHz.

16. A method of operating a radar sensor for a motor vehicle to sense at least one of a gesture or an object, comprising:
   mounting a radar housing on the motor vehicle, the radar housing having an antenna disposed within the radar housing; and
   configuring the antenna to project radio frequency energy through a field of view to detect the object or the gesture within a footprint of the motor vehicle, wherein at least one of the radar housing and the antenna is configured to control the field of view about the motor vehicle, and wherein the antenna is configured to shape the field of view to within a footprint of the motor vehicle such that the field of view does not extend outside of the footprint of the motor vehicle, and wherein the footprint represents the area defined by an outer extent of the motor vehicle projected down on the ground below the motor vehicle.

* * * * *